US011361068B2

(12) United States Patent
Sethi et al.

(10) Patent No.: US 11,361,068 B2
(45) Date of Patent: Jun. 14, 2022

(54) SECURING PASSWORDS BY USING DUMMY CHARACTERS

(71) Applicant: Dell Products L. P., Round Rock, TX (US)

(72) Inventors: Parminder Singh Sethi, Ludhiana (IN); Lakshmi Saroja Nalam, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 16/698,859

(22) Filed: Nov. 27, 2019

(65) Prior Publication Data

US 2021/0157900 A1 May 27, 2021

(51) Int. Cl.
G06F 21/31 (2013.01)
G06F 21/00 (2013.01)
G06F 21/46 (2013.01)
H04L 9/40 (2022.01)

(52) U.S. Cl.
CPC ............ *G06F 21/46* (2013.01); *H04L 63/083* (2013.01)

(58) Field of Classification Search
CPC .............................. G06F 21/46; H04L 63/083
See application file for complete search history.

(56) References Cited

U.S. PATENT DOCUMENTS

| 2015/0143509 A1* | 5/2015 | Selander ................. G06F 21/46 726/18 |
| 2017/0243156 A1* | 8/2017 | Janis ..................... G06Q 10/087 |
| 2020/0134168 A1* | 4/2020 | Hwang .................... G06F 21/40 |

FOREIGN PATENT DOCUMENTS

JP 2015007941 A * 1/2015

OTHER PUBLICATIONS

Alsuhibany, S. A., & Almutairi, S. G. (2016). Making PIN and password entry secure against shoulder surfing using camouflage characters. International Journal of Computer Science and Information Security, 14(7), 328. (Year: 2016).*

* cited by examiner

*Primary Examiner* — Alexander Lagor
(74) *Attorney, Agent, or Firm* — Krishnendu Gupta; Deepika Bhayana; Derek Lam

(57) ABSTRACT

Various systems and methods are provided for using dummy characters to provide enhanced security of a user's login credentials. The functionality disclosed herein provides specific steps for the creation, evaluation, storage, and use of such dummy characters in conjunction with a user's login credentials. Dummy characters can be thought of as characters that are not part of a user's actual password, but which are mixed in and around the actual characters when the password is being entered, in order to protect a user's true password from prying eyes and nefarious actors. Dummy characters can be associated with a specific user and/or a specific device or devices associated with a specific user. The functionality provided herein prevents a nefarious actor from simply repeating an entire password string (including the dummy characters) on a device that is not associated with the user whose credentials the nefarious actor is attempting to misappropriate.

20 Claims, 13 Drawing Sheets

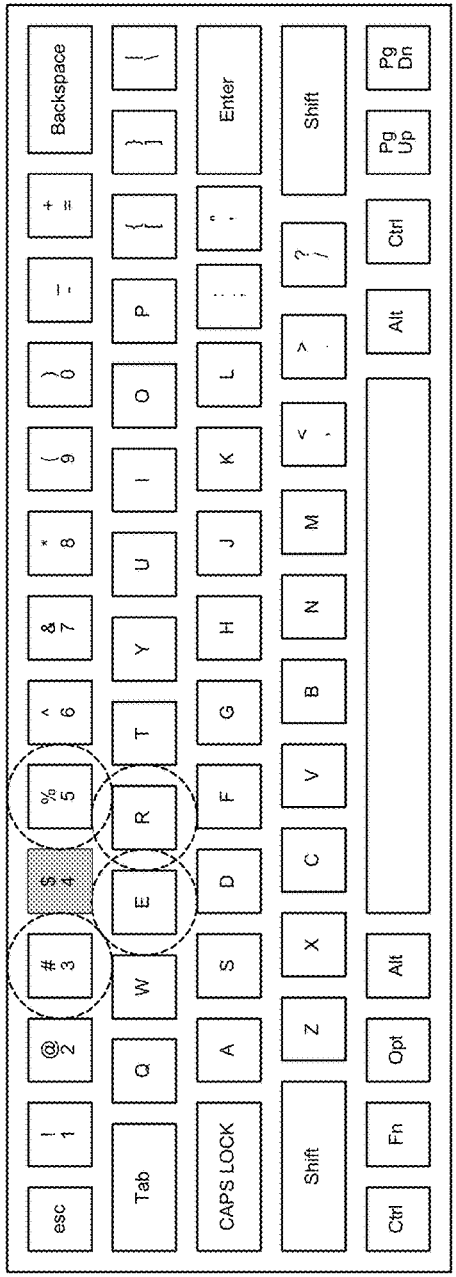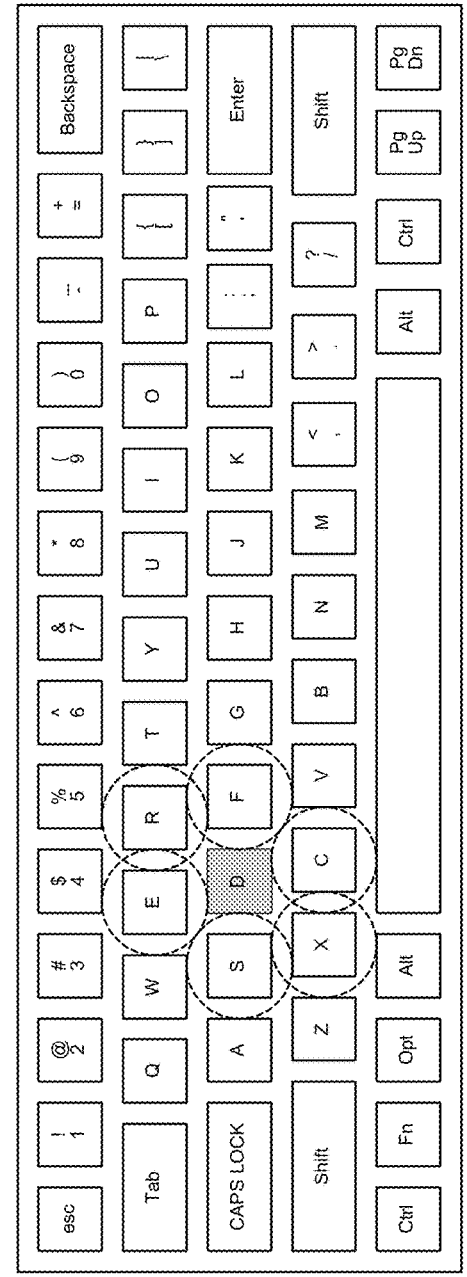

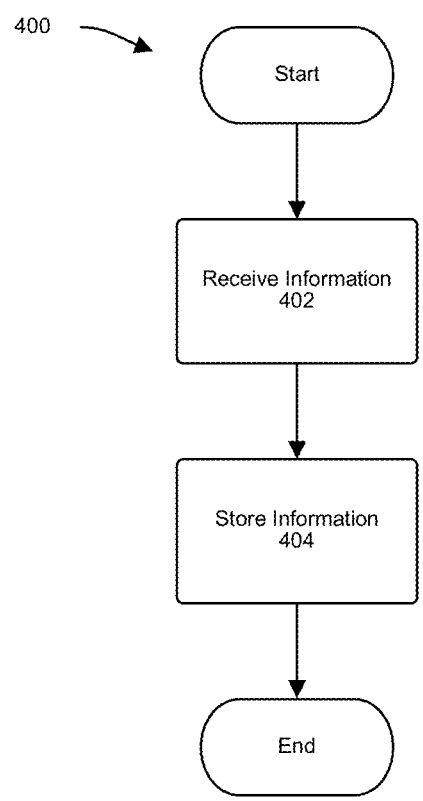

SECURING PASSWORDS BY USING DUMMY CHARACTERS

BACKGROUND OF THE INVENTION

Field of the Invention

This invention generally provides functionality for increasing password security, and more specifically provides functionality for increasing the security of passwords by using dummy characters intermixed with the actual characters of the password.

Description of the Related Art

As the value and use of information continues to increase, individuals and businesses seek additional ways to protect their user accounts from being hacked or otherwise improperly accessed by nefarious users. A key component of keeping user accounts (and their related information) safe is the user of passwords. However, in our increasingly busy and hectic world, another person is often standing nearby when a user enters his or her password. If such people so desire, they can fairly easily observe the sequence of characters entered by the user (such as, e.g., by watching to see which keys the user pushed, and in what sequence). Alternatively, cameras or other technology can also be used to determine this information, especially if the information protected by the user's login credentials is sufficiently valuable to someone else. After identifying the specific sequence of keys entered when a user is entering his or her password, a nefarious person or entity can then simply enter those same characters (along with the user's username, which, unlike a password, typically is openly displayed during the login process for anyone nearby to easily observe) on a different machine and thereby improperly access (or "hack" into) the innocent user's account. Therefore, functionality is desirable to protect and disguise a user's password from people who may observe the user entering that password and wishing to use that password to hack into that user's account.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

The disclosure generally includes methods, computer program products, computer systems, and the like, that provide for creating and using dummy characters to provide enhanced security of a user's login credentials. The functionality disclosed herein provides specific steps for the creation, evaluation, storage, and use of such dummy characters in conjunction with a user's login credentials. As described more fully herein, dummy characters can be thought of as characters that are not part of a user's actual password, but which are mixed in and around the actual characters when the password is being entered, in order to protect a user's true password from prying eyes and other nefarious actors. These dummy characters can also be associated with a specific device or devices associated with a specific user. This prevents a nefarious actor from simply repeating the entire password string (including the dummy characters) on a device that is not associated with the user whose credentials the nefarious actor is attempting to mis- appropriate. Moreover, because the dummy characters are not part of the actual password, this functionality enables a user to enter many "different" password strings that all ultimately evaluate to the user's actual password when processed by the systems, methods, and other functionality described herein.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 3B is a block diagram depicting an example input device (e.g., a QWERTY-style English-language keyboard), with certain keys highlighted and circled for use in the discussion of FIG. 3A, according to one embodiment of this disclosure.

FIG. 3C is a block diagram depicting an example input device (e.g., a QWERTY-style English-language keyboard), with certain keys highlighted and circled for use in the discussion of FIG. 3A, according to one embodiment of this disclosure.

FIG. 4 is a flowchart for performing various steps of a process to store information such as a password with associated dummy characters, according to one embodiment of this disclosure.

DETAILED DESCRIPTION

The disclosure generally includes methods, computer program products, computer systems, and the like, that provide for creating and using dummy characters to provide enhanced security of a user's login credentials. As will be discussed in more detail below, the functionality disclosed herein provides specific steps for the creation, evaluation, storage, and use of such dummy characters to protect a user's true login credentials. As described more fully herein, dummy characters can be thought of as characters that are not part of a user's actual password, but which are mixed in and around the actual characters when the password is being entered, in order to protect a user's true password from prying eyes and other nefarious actors. These dummy characters can also be associated with a specific device or devices associated with a specific user. This prevents a nefarious actor from simply repeating the entire password string (including the dummy characters) on a device that is not associated with the user whose credentials the nefarious actor is attempting to misappropriate. Moreover, because the dummy characters are not part of the actual password, this functionality enables a user to enter many "different" password strings that all ultimately evaluate to the user's actual password when processed by the systems, methods, and other functionality described herein.

Figure 1A:
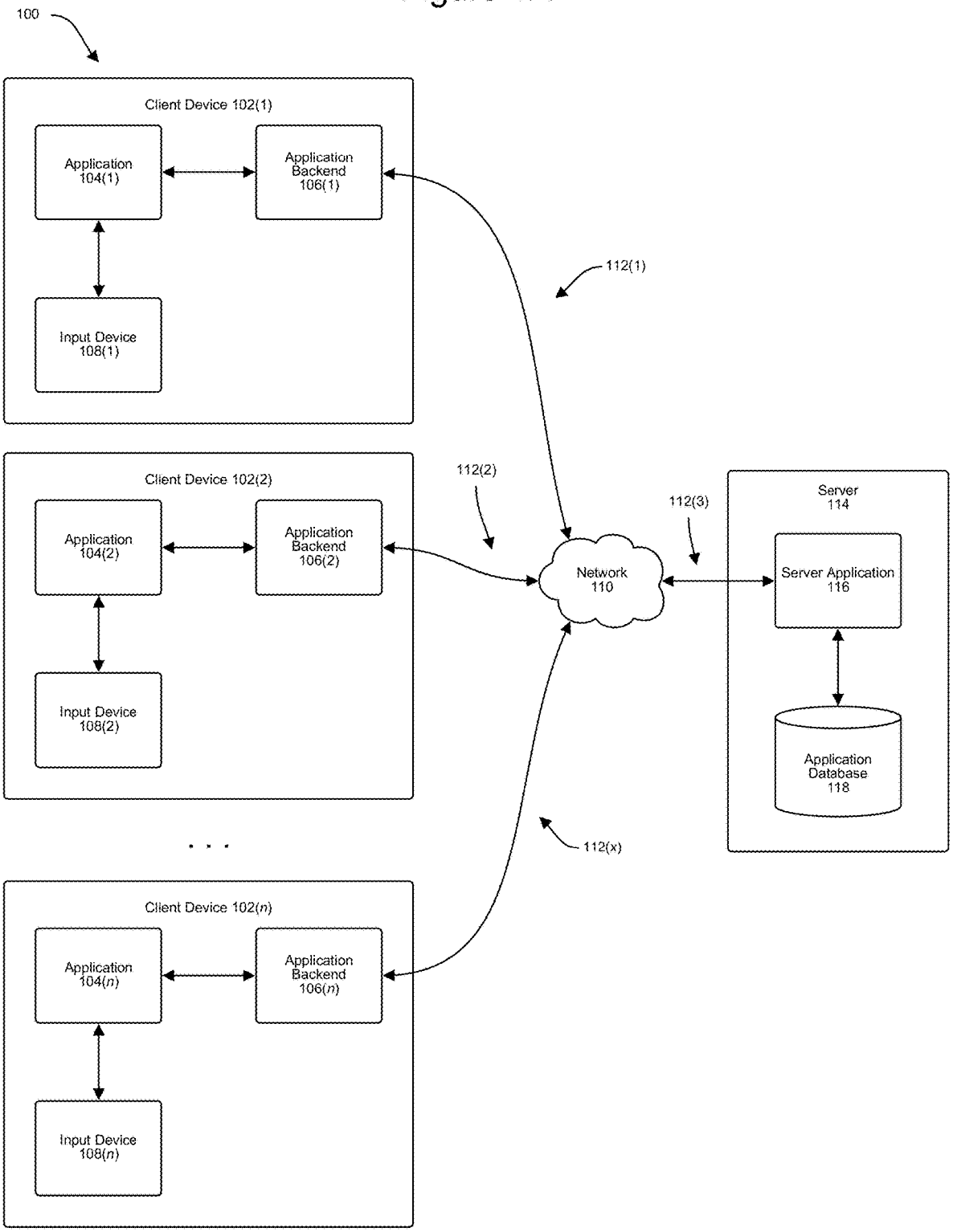
FIG. 1A is a block diagram depicting an example computing environment, according to one embodiment of this disclosure.

FIG. 1A illustrates a block diagram of an example computing environment 100 that includes a plurality of client devices 102(1)-102(n) (collectively, "client device(s) 102"). Each client device 102 can be any computing device, such as a personal computer, laptop computer, notebook computer, personal computing device (e.g., a smart phone), or any other computing device as described herein. Although not expressly shown in FIG. 1A, each client device 102 can also include various other components, such as a microprocessor, memory, a display screen, networking capabilities, and so forth. Moreover, as used throughout this disclosure, the reader will appreciate that the letter n (and other such letters, such as x) is/are used to indicate a variable number of devices or components. Although such letters are used in describing a variable number of instances of each of these different devices and components, a repeated use of a given letter (e.g., n) does not necessarily indicate that each device and component has a same number (e.g., n) of instances implemented in the example system discussed herein, or in any other embodiment of this invention.

Each client device 102 can be configured to execute an application such as applications 104(1)-104(n) (collectively, "application(s) 104"). Each application 104 is a computer program, component or module of a computer program, or another form of computer code (e.g., a webpage) configured to perform various aspects of functionality described herein. In various embodiments, and as will be discussed in more detail below, each application 104 can take the form of either a webpage or the "front end" of a computer program, such as the user interface and related functionality of such a computer program. In other embodiments, other configurations are possible.

As can be seen from FIG. 1A, each application 104 is set up in a manner that allows a given application 104 to communicate with an application backend, such as application backends 106(1)-106(n) (collectively, "application backend(s) 106"). Each application backend 106 is a computer program, component or module of a computer program, or another form of computer code configured to perform various aspects of functionality described herein. In the embodiment shown, each application 104 and the associated application backend 106 are depicted as separate computer programs or other forms of computer code that can communicate with each other and which are respectively configured to perform various aspects of the functionality disclosed herein. However, the reader will appreciate that, although each application 104 and the associated application backend 106 are shown as distinct components in FIG. 1A, which is done primarily for ease of explanation, in practice an application 104 and the associated application backend 106 can be part of the same unitary computer program. In such a situation, application 104 can conceptually be thought of as the "front end" or "user interface" component(s) of the program, and the associated application backend 106 can conceptually be thought of as the "back end" or "engine" of the program, that is, the programming logic and functionality that is not necessarily visible to the user in most cases. In other embodiments, other configurations are possible as well.

Each application 104 is also set up in a manner that allows a given application 104 to also communicate with an input device, such as input devices 108(1)-108(n) (collectively, "input device(s) 108"). Each input device 108 can be any sort of input device that allows for a user to enter input into the associated application 104, such as, e.g., input taking the form of the characters (or other components) of a password. In practice, however, input devices 108 will most commonly be either tactile or digitized (on-screen) keyboards. An example of one such keyboard can be seen in FIG. 1B, which will be discussed further below. Of course, other input devices and other keyboard layouts are also possible.

As can be seen from FIG. 1A, each application 104 can directly communicate with the associated application backend 106 and the associated input device 108 on the same client device 102 as the associated application 104. For instance, application 104(1) can directly communicate with application backend 106(1) and input device 108(1) on client device 102(1); application 104(2) can directly communicate with application backend 106(2) and input device 108(2) on client device 102(2); and any application 104(n) can directly communicate with application backend 106(n) and input device 108(n) on the same client device 102(n).

As also shown in FIG. 1A, each client device 102 (and/or a component thereof, such as an application backend 106) is connected to a network 110 via one of connections 112(1)-112(x) (collectively, "connection(s) 112"). Network 110 can be any sort of network, including a local area network ("LAN"), wide area network ("WAN"), storage area network ("SAN"), the Internet, an intranet, and so forth. Each of the connections 112 can be any sort of wired and/or wireless network connection, such as an Ethernet connection, a Fiber Optic connection, a BLUETOOTH connection, and so forth, including various combinations of the foregoing technologies. Although only one network 110 is depicted in FIG. 1 for the sake of explanation, in practice more or less instances of network 110 can be used.

Through the various connections and networks, each node 102 shown in FIG. 1A is ultimately connected to a server, such as, e.g., server 114. Each server 114 can be any computing device, such as a personal computer, laptop computer, notebook computer, server, or any other computing device that is capable of hosting and/or communicating with one or more of the associated components of server 114, such as are shown in FIG. 1A and which will be discussed in more detail below. Although not expressly shown in FIG. 1A, each server 114 can also include other components that are necessary for its functionality, such as a microprocessor, memory, networking capabilities, and so forth. Moreover, although only a single server 114 is depicted in FIG. 1A, in practice more than one server can be used, and the components and/or functionality of server 114 can be divided among multiple such servers. In other embodiments, a client device can be configured to perform the functionality described herein without communicating with a server in the process of performing the functionality described herein.

As can be seen from FIG. 1A, server 114 is configured to execute server application 116. (Although only a single server application 116 is depicted in FIG. 1A, in practice more than one server application can be used in conjunction with this invention.) Server application 116 is a computer program, component or module of a computer program, or another form of computer code configured to perform various aspects of functionality described herein. In one embodiment, server application 116 is configured to communicate with one or more application backends 106 (such as via network 110 and one or more of connections 112) and application database 118, the latter of which will be discussed in more detail below. In the embodiment shown, server application 116 and the various application backends 106 are depicted as separate computer programs or other forms of computer code that can communicate with each other and which are respectively configured to perform various aspects of the functionality disclosed herein. However, the reader will appreciate that, although server application 116 and the various application backends 106 are shown as distinct components in FIG. 1A, which is done primarily for ease of explanation, in practice a server application 116 and an application backend 106 can be part of the same unitary computer program. For instance, in an embodiment where application 104 is a webpage, client device 102 may receive information from the webpage (such as via a web browser) and forward that information directly to server application 116, which could then effectively function as the application backend for that webpage. In other embodiments, other configurations are possible as well.

Server 114 also includes application database 118. Application database 118 can be any form of storage (and therefore does not have to be a formal "database" per se) that is capable of information storage and retrieval, such as is required to perform certain aspects of the functionality disclosed herein. As depicted in FIG. 1A, application database 118 is directly connected to server application 116, but it not directly connected to any of the client-side functionality shown in FIG. 1A (although the client-side functionality can communicate with application database 118 indirectly, such as, e.g., via server application 116 and the intervening network 110 and connections 112). The reader will appreciate that this architecture is provided as "good practice," in order to prevent the contents of application database 118 from being tampered with, maliciously accessed, and so forth. In practice, however, application database 118 is not necessarily required to be protected in this manner in order for the functionality described herein to function properly.

Moreover, although one specific configuration is shown in FIG. 1A, many other configurations of system 100 are possible. For instance, although multiple client devices 102 (and their associated components) are depicted in FIG. 1A, in practice this invention can be used with a single client device. Additionally, although each application backend 106 is depicted in FIG. 1A as being part of the same client device 102 that stores the associated application 104, in practice a given application backend 106 can reside on a physical computing device (e.g., a server or other computer) that is completely physically separate from the associated client device 102. For instance, in an embodiment where application 104 is a webpage executing on a client device 102, the associated application backend 106 may be computer code and/or a compiled computer program executing on a server, such as server 112 (which will be discussed below) or on another such computing device. Other configurations are possible as well.

Figure 1B:
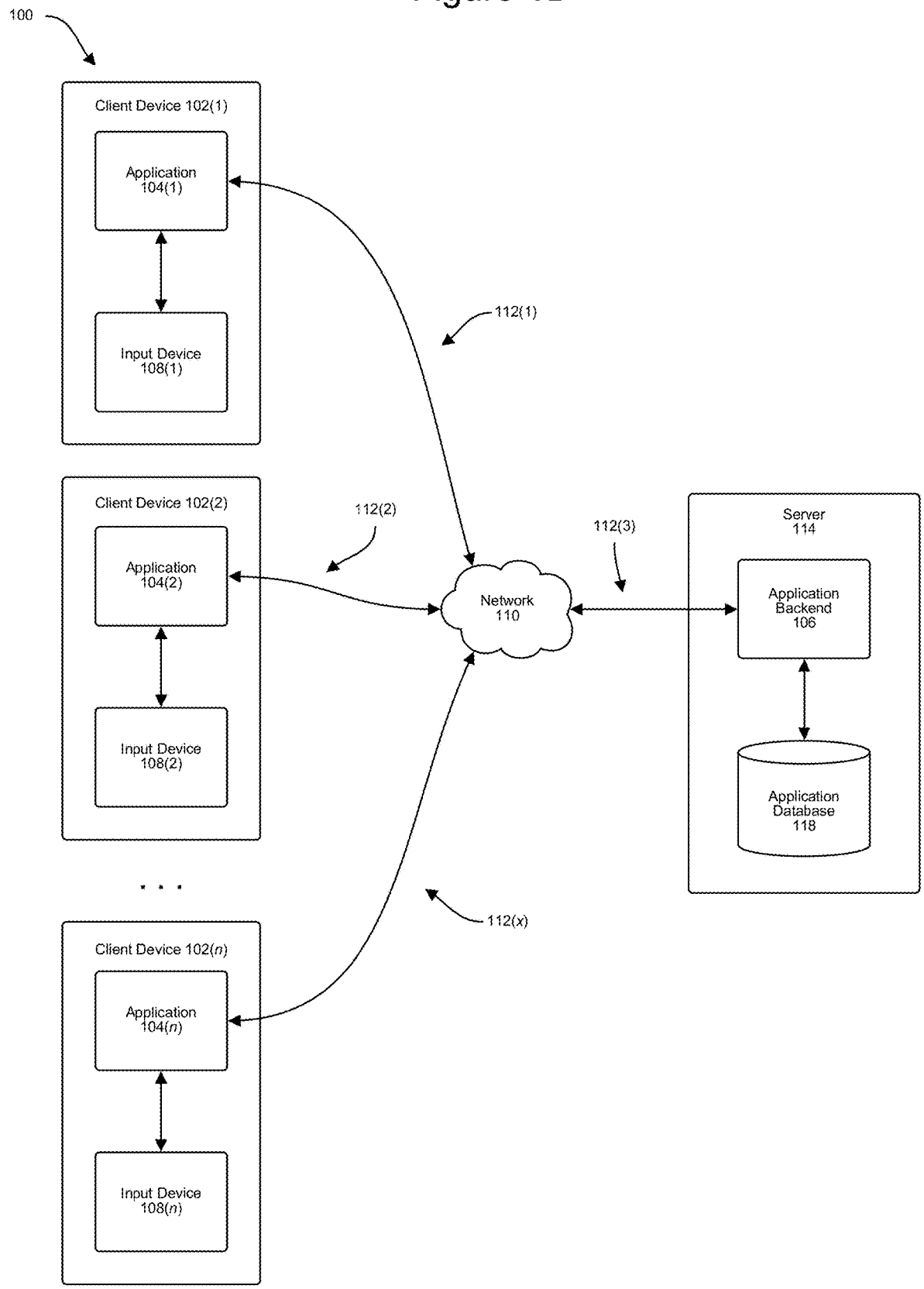
FIG. 1B is a block diagram depicting an alternate example computing environment, according to one embodiment of this disclosure.

FIG. 1B illustrates a block diagram of a second example of computing environment 100. As the reader will observer, FIG. 1B is substantially similar to FIG. 1A. However, in FIG. 1B, only a single application backend 106 is depicted, and that application backend 106 is located on server 114. In the example embodiment depicted in FIG. 1B, server application 116 is not present, due to the presence of the application backend 106 on server 114. In still another embodiment, which is not specifically pictured, application backend 106 may consist of related modules with one such module being stored on each client device 102, as depicted in FIG. 1A, and the other related module being stored on server 114, similar to what is shown in FIG. 1B. In still other embodiments, other configurations are possible.

Figure 1C:
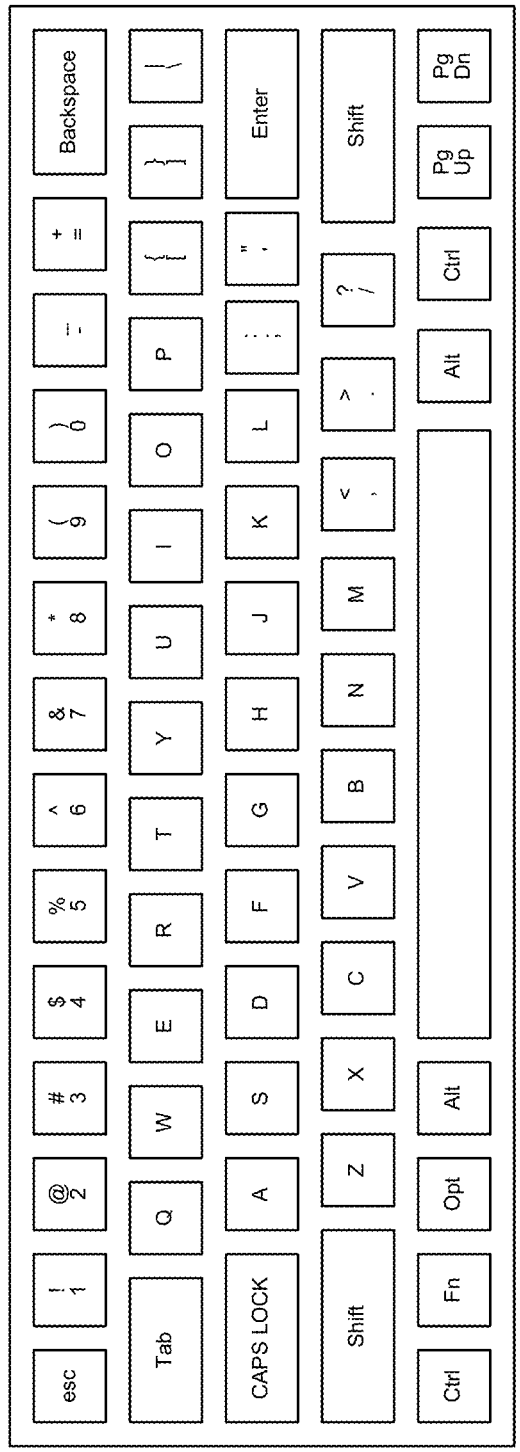
FIG. 1C is a block diagram depicting an example input device (e.g., a QWERTY-style English-language keyboard), according to one embodiment of this disclosure.

FIG. 1C provides enhanced details of a sample input device 108, which in this case is shown in the form of a tactile keyboard. This example keyboard layout is being provided primarily for ease of discussion later in this disclosure, and is not intended to be limiting in any manner. For instance, although an example of the layout of an English language keyboard is shown here, many other layouts are possible, both in English and in other languages. Moreover, the reader will appreciate while the layout of this keyboard is fairly standard (particularly with respect to the number and letter keys) of a tactile keyboard, such as a standalone keyboard connected to a desktop computer or a keyboard that is part of a laptop computer, in practice keyboards may have fairly significantly different layouts when such keyboards are provided electronically (e.g., on the screen of a touchscreen device, such as a smart phone), and may often require flipping through multiple screens to access certain keys and/or characters. As stated above, the specific layout shown in FIG. 1C is only being provided as an example for ease of discussion herein, and is not intended to be limiting in any way.

Figure 2:
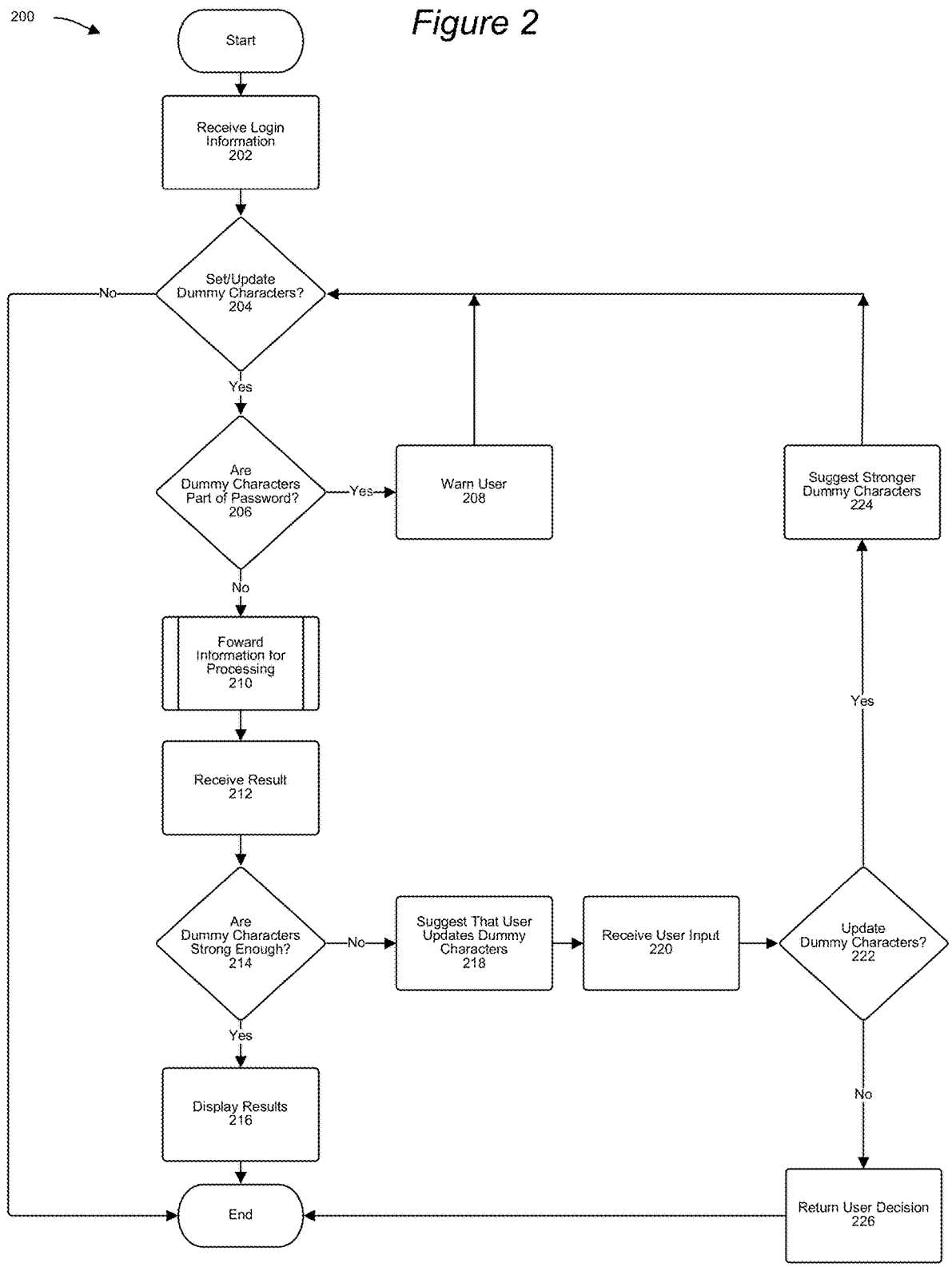
FIG. 2 is a flowchart for performing various steps of a process to create and evaluate a password with associated dummy characters, according to one embodiment of this disclosure.

FIGS. 2, 3A-3F, and 4 collectively illustrate various actions generally pertaining to the process of entering, evaluating, and registering or storing information such as a username, password, and related dummy characters. Turning first to FIG. 2, FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIGS. 1A, 1B, and 1C. In the flow diagram of FIG. 2, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 200 is described with reference to FIGS. 1A, 1B, and 1C as described above, although other models, frameworks, systems and environments may be used to implement these processes.

To provide more detail, FIG. 2 is a flowchart of a process 200 that includes registering one or more dummy characters associated with a given combination of a username, password, and/or one or more identifying values (such as will be described in more detail below), according to some embodiments. The process 200 may be performed by a computing device (such as, e.g., any client device 102) as described herein, and process 200 may also be performed in conjunction with one or more steps of one or more other processes described herein, such as method 300 and method 400.

In one embodiment, method 200 begins at 202, where method 200 receives login information such as, e.g., a username, a password, and one or more identifying values. Regarding the identifying values, the reader will appreciate that in certain embodiments, a client device itself (e.g., a smart phone, or a laptop computer) can be associated with a user account connected to the device as a whole, and that once the user has logged into client device itself, the user can then use the client device to log into another account that is associated with distinct login credentials (e.g., username and password). For instance, an employee of DELL may have one set of login credentials (e.g., a username and password combination) that enables the employee to log onto a company-issued smart phone, a company-issued laptop computer, and one or more other company-issued devices. Once the user has logged on to any of those devices, the user may then wish to use separate login credentials (e.g., a username and password combination) to log onto a personal user account, such as one of the user's social media accounts. As the reader will appreciate, security can be further enhanced by giving the user the option to associate specific dummy characters with his or her personal (or work) accounts (such as, e.g., social media accounts or a work-related email account or perhaps access to certain documents or wiki's, and so forth), and to different (although potentially overlapping) specific dummy characters with each user device to which he or she has access. For instance, consider an example where a user has a password of "$Dell321!" (without the quotation marks). The user may wish to associate the dummy characters {d, E, L} with the personal/work account regardless of which client device the user uses to login to that account. But the user may also wish to further associate the dummy characters {@, #} with that same account when a first user device is being used, but to associate the dummy characters {4, 5} with that same account when a second (different) user device is being used. As such, when the user logs onto that account from the first of these devices, his or her available dummy characters would effectively be {d, E, L, @, #} but when the user logs onto that same account from the second of these devices, his or her available dummy characters would effectively be {d, E, L, 4, 5}. This functionality provides increased security by preventing a nefarious actor (or other person or device) or who/which observes the user entering his or her password (including the dummy characters) on a first device from gaining unauthorized access to the user's account simply by entering the exact same string of characters (including the dummy characters) on a second device, even if that second device is associated with the same user. For the sake of the discussion herein, an identifying value (or simply a "value," for short) associated with the client device that the user is using will be referred to as a "unique device identifier," or "UDID" for short, and can identify any device, such as any client device 102; and an identifying value associated with the user account to which the dummy characters are specifically being linked (e.g., a personal or work account, as described above) will be referred to as a "unique user identifier," or "UUID."

In certain embodiments, the information received in 202 may be received as part of the process of registering a new user account. In other embodiments, this information may be received when a previously-registered user logs into his or her account. At 204, method 200 determines whether to either set or update a user's password (and/or to set or update the dummy characters associated with a user's login, password, and specific client device). If 204 evaluated in the negative, then method 200 ends. The rest of this discussion will focus on the situation where 204 evaluates in the affirmative. In certain embodiments, 204 may evaluate in the affirmative when a user makes an affirmative request to set or update the dummy characters associated with his or her password. In other embodiments, a system may require a user to set or update his or her dummy characters even if the user does not make a specific request to do so, such as when the system is creating a new user account (and therefore may require the user to set his or her dummy characters at that time), after a certain period of time has expired (in which case the system may require the user to update his or her dummy characters), and/or when the previous password has become invalid for any reason (in which case the system may require the user to update his or her dummy characters when updating his or her password).

Moreover, although the term "update" is used in conjunction with 204, the reader will appreciate that the specific dummy characters being provided at one point in time do not necessarily have to differ from the dummy characters that were previously used. For instance, a user may update his or her password by providing a new password, and may "update" his or her dummy characters by providing either different dummy characters than were previously being used, the same dummy characters that were previously being used, or some combination of the foregoing.

As for the dummy characters themselves, the dummy characters can be either individual characters and/or strings of characters. For instance, and continuing with the example given above, let us assume that the user is using a password of "$Dell321!" (without the quotation marks). The user may choose to use characters surrounding the D and the L on their input device (e.g., input device 108(*n*)), such as, e.g., the English-language QWERTY style keyboard shown in FIG. 1C (which will be used for the sake of discussion herein) as his or her dummy characters. For instance, the user may select S, F, K, and : (colon) as his or her dummy characters associated with the password noted above ($Dell321!). (Like most passwords, dummy characters are also case sensitive.) Since the system will remove (or block) the dummy characters prior to evaluating a password (subject to the other parameters and functionality described herein), a password that is subsequently entered (such as in conjunction with method 500, described below) as $SDFelKl:321! will evaluate to $Dell321! after the dummy characters (in this case, S, F, K, and : (colon)) are removed. Likewise, a string such as $SDKellK:KS321! would also evaluate to $Dell321! after the dummy characters (S, K, K, : (colon), K, and S) are removed. The order in which the dummy characters are entered (either when setting the dummy characters, or when using the dummy characters within a password) is not important. Anytime the system encounters a dummy character when evaluating the password, the dummy character will be removed, regardless of the order in which those dummy characters are entered or the location in the password string in which those dummy characters are entered.

Dummy characters can also be strings of characters that are treated as a single dummy character (or "dummy character sequence") when entered consecutively in a specific sequence, but which would be treated as individual characters otherwise. For instance, continuing with the example above, consider a situation where the user choses S, F, K, and QW as the dummy characters to go along with the password provided above. In this example, the user's dummy characters are capital S (anytime this character is encountered in a password), capital F (anytime this character is encountered in a password), capital K (anytime this character is encountered in a password) and QW (only treated as dummy characters when entered as a sequence). (Of course, if an individual dummy character, such as S, F, or K in this example, is entered back-to-back in password, such as SS or FF or KK, or even SSS or FFFF, or KKKKK, then each individual dummy character will be treated as a dummy character standing alone, and as such all instances of that dummy character will be removed; but in the case of QW, the dummy character sequence will only be removed if both characters are entered back-to-back in the manner specified, e.g., as a single string or unit.) For instance, if a user has the password noted above and the dummy characters noted in this paragraph, and enters his or her password as $QSSWDell321K!, then each instance of the individual dummy characters (S, S, and K) would be removed. However, since the Q and W are only treated as dummy characters when entered as a sequence of characters, which is not the case here, then those characters would not be removed from the password when the system removes the dummy characters. As such, $QSSWDell321K! would evaluate to $QWDell321!, and the password evaluation would fail. (The reader will appreciate that a "second round" of removing the dummy characters typically would not be performed for a single instance of a password entry. As such, even though "QW" end up being next to each other after the initial round of dummy characters are removed, the QW would not be treated as a dummy character sequence since they were not entered as a sequence, but rather were entered as individual characters with other characters between them.) However, if the user entered $SSSQWDell321K!, which includes the characters QW in sequence, then both the individual dummy characters (S, S, and K) as well as the specified dummy character sequence (QW) would all be removed when evaluating the password, since the QW was entered as a sequence of characters. The password would thusly evaluate to $Dell321! after the dummy characters were removed, and the password entry would be considered valid in that case.

After the dummy characters are entered in 204, method 200 can perform an initial check to determine whether any of the dummy characters are also part of the password. In the event that one or more of the dummy characters are also part of the password, the system should throw an error and/or otherwise warn the user in 208 that the password+dummy character combination entered is not valid. If none of the dummy characters are part of the password, then method 200 proceeds to 210.

Regarding the determination of 206, the reader will appreciate that the system could not properly evaluate a password (such as in conjunction with methods 500, 600, and 700) if a single character (or character sequence) is part of the password and also a dummy character (or dummy character sequence). For instance, continuing with the example password used above (i.e., $Dell321!), if the user tried to enter a character such as capital D, or lowercase e, or a number such as 3, as part of his or her dummy characters, the system would treat this as an error since each of the aforementioned characters (D, e, and 3) are also part of the password. However, since both passwords and dummy characters are (at least typically) case sensitive, the user can use an opposite-case letter (such as, e.g., lowercase d or a capital E) as dummy characters in conjunction with the example password provided above (i.e., $Dell321!), and this would not cause an error at 206, since the system could distinguish between the capital D in the password and the lowercase d being used as a dummy character (and likewise with the lowercase e in the password and the capital E being used as a dummy character).

As another example, consider a situation with the same example password used above (i.e., $Dell321!), but where the user attempts to use the following dummy characters: S, F, K, and D. Because D is part of the password and also a (standalone) dummy character, method 200 would throw an error if this combination was encountered at 206. However, if the user truly wishes to use a D as part of his or her dummy characters, he or she could do so by including the D in a sequence of dummy characters, such as, e.g., DD or DE or SD, among many other examples. For instance, consider a situation where the user enters the following dummy characters in combination with the example password above: S, F, K, and DD. This would be acceptable (and thus 206 would evaluate in the negative, not finding an error) since the system can distinguish between DD as a dummy character sequence, and D as an individual character within the password. For instance, if a user entered this password+dummy character combination, and then subsequently entered $DDDell321! as his or her password, the system would know to treat "DD" as a dummy character sequence and remove that dummy character sequence before evaluating the rest of the password (such as when performing methods 500 or 600). This entered password would evaluate to $Dell321! (and thus be valid) after the dummy character sequence of DD was removed. However, if a user subsequently entered $DDell321! as his or her password, then the system would remove "DD" as a dummy character sequence when evaluating the password (such as when performing methods 500 or 600), leaving a result of $ell321!, which would obviously evaluate as an incorrect password (such as when performing methods 500 or 600 to evaluate an entered password in the future). However, the possibility of user error when entering a password+dummy character combination in the future does not invalidate the password+ dummy character combination itself (such as for purposes of performing method 200).

Another scenario to consider here is when a user attempts to enter a dummy character sequence but that exact sequence is also present in the password. For instance, consider again the example password discussed above (i.e., $Dell321!). The reader will notice that this password contains two consecutive lowercase L's (i.e., ll) as part of the password. Therefore, if the user attempts to enter a single standalone lowercase L (i.e., l) as part of his or her dummy characters, method 200 would throw an error at 204. Likewise, if the user attempts to enter two consecutive lowercase L's (i.e., ll) as part of his or her dummy characters, method 200 would also throw an error at 206 since this exact sequence is also found in the password. However, if the user attempted to enter some other sequence of characters that included two consecutive lowercase L's as part of his or her dummy characters, that sequence would potentially be valid (and thus would not result in an error at 206), as long as that exact sequence was not also included in the password. For instance, and continuing with the example password above, the user could enter three consecutive lowercase L's as a dummy character sequence (i.e., lll) or some other sequence that contained one lowercase L in combination with one or more other characters (e.g., lp) or two consecutive lowercase L's in combination with one or more other characters (e.g., llm), and each of these dummy character sequences would be acceptable since neither lll, lp, or llm appear in that exact sequence in the associated password. However, if the user attempted to enter some other dummy character sequence that appeared exactly in the password, such as "Del" or "ell" or "ll3", any of these dummy character sequences would be invalid since each of those character strings appears exactly in sequence within the associated password (again using $Dell321! as an example password).

In light of the foregoing examples and explanations, if method 200 determines at 206 that one or more of the proposed dummy characters are present in the associated password, and/or that one or more of the proposed dummy character sequence is present (in the exact same sequence) in the associated password, then method 200 proceeds to 208 and warns the user of this error, at which point control of method 200 can either return to 204 (in the embodiment shown in FIG. 2), or take other remedial action (not shown), or end (also not shown). If method 200 determines at 206 that none of the proposed dummy characters are present in the associated password, and that no proposed dummy character sequence is present (in the exact same sequence) in the associated password, then 206 evaluates in the negative and method 200 proceeds to 210.

At 210, information is forwarded for further processing. In one embodiment, the username, password, dummy characters, and one or more identifying values (such as, e.g., a UDID and/or UUID) are forwarded for further processing. In certain embodiments, 210 may also forward information indicating whether any or all of the dummy characters should be limited to a specific user device (such as can be identified, e.g., by a UDID as described herein), or whether any or all of the dummy characters should be associated with any device that the user is logged into (and thus effectively tied to a UUID, as described herein). In other embodiments, more or less information than the foregoing can be forwarded for further processing. In one embodiment, the information forwarded in 210 is forwarded to another component or module of the computer system, such as an application backend 106. (In embodiments using an architecture similar to that shown in FIG. 1A, where an application backend is present on each client device, the information would typically be forwarded to the specific application backend 106(x) on the same client device 102(x) as the application 104(x) (or other component, module, or functionality) that is performing method 200. In embodiments using an architecture that is more similar to that shown in FIG. 1B, where all of the client devices 102(1)-(n) share a single application backend 106 on server 114, the information would typically be forwarded to that single application backend 106.) The processing associated with 210 includes functionality such as evaluating the strength of the dummy characters that have been entered, potentially suggesting new dummy characters if the current dummy characters are determined to be too weak (or any similar determination), and/or storing the dummy characters (such as in application database 118) for further use. The processing associated with 210 will be discussed in more depth below, in conjunction with the discussion of FIG. 3A and method 300 (and the accompanying block diagrams of keyboards). The reader will appreciate that, in one embodiment, the functionality associated with 210 will be performed by another module, component, or program of system 100, such as (an) application backend 106. In the event that the software executing method 200 passes control to another module, component, or program to perform 210, control will be returned to method 200 to continue execution at 212.

At 212, method 200 receives the result of 210 (and method 300). As examples of the types of information that can be received at 212, method 200 can receive information indicating whether the dummy characters are sufficiently strong, as well as information indicating whether (or not) any errors were encountered during the performance of 210 (and method 300). For instance, if the dummy characters were found to be sufficiently strong and no errors were otherwise generated by method 200 or 300, a result may be received at 212 indicating that the user's password and/or dummy characters have been successfully set or updated, as appropriate. In such a situation, 214 will evaluate in the affirmative by determining (based, at least in part, on the information received in 212) that the dummy characters entered by the user are strong enough, and method 200 will proceed to 216. At 216, method 200 will display a result to the user indicating that his or her dummy characters (and, if appropriate, his or her password) has/have been successfully updated. Method 200 will then end.

However, if the result received at 212 indicates that the dummy characters are not sufficiently strong, and/or that any other error occurred, 214 will evaluate in the negative by determining (based, at least in part, on the information received in 212) that the dummy characters entered by the user were not strong enough (and/or that an error has occurred), and method 200 will proceed to 218. At 218, method 200 will display a result to the user indicating that his or her dummy characters (and, if appropriate, his or her password) are not strong enough and/or that the dummy characters entered by the user are otherwise insufficient. Method 200 will prompt the user for input regarding inquiries and information such as, e.g., whether the user wants to update the dummy characters, or alternatively whether the user wants to continue to use the previously-entered dummy characters even if they were not sufficiently strong, or as a third possible alternative, whether the user does not want to use any dummy characters at all. Method 200 receives the result of this decision in 220, via a user input or similar functionality.

At 222, method 200 determines how to proceed based on the input received in 220. If the user indicates a decision to update the dummy characters, then 222 evaluates in the affirmative and method 200 performs 224. At 224, method 200 displays one or more suggested dummy character(s) that would be stronger than the previously-entered dummy characters, and/or other information that may help a user choose better dummy character(s). The information displayed in 224 can include information received in 212, and/or can include information determined via a separate query (such as to one or more steps of method 300, or in another manner) to determine the appropriate information to display here. In an alternate embodiment, the information of 224 can be displayed as part of 218 (and therefore, at the same time as the information displayed at 218). In any event, when 222 evaluates in the affirmative, 224 is performed (if needed), and method 200 then returns to 204 to allow the user to enter a different set of dummy characters (and/or to change his or her password, which can affect the evaluation of the strength of the dummy characters).

If the user indicates in 220 that he or she does not wish to update his dummy characters, then 222 evaluates in the negative and method 200 proceeds to 226. At 226, information is returned (such as, e.g., to method 300, application backend 106, and/or another module or component of system 100) indicating that the user does not wish to update his or her dummy characters. (The reader will appreciate that the user may use the dummy characters of his or her choice, even if those dummy characters are found to be weak, so long as the dummy characters do not fail the evaluation of 206, as described above. For instance, the dummy characters may form a pattern on a keyboard that is easy for a user to remember, such as the characters at the "four corners" of the alphabetic portion of a standard QWERTY-style English language keyboard, i.e., Q, P, M, and Z. As another example, a user may choose to use his or her initials, or the initials of a loved one, or letters that form his or her first or middle name, or keys that he often uses while playing a video game, among myriad other examples and possibilities. In any of these situations, among others, and the user may choose to use easy-to-remember (or otherwise preferable, for any reason) dummy characters even though they are weak.) If 222 evaluates in the negative, step 226 is performed and method 200 ends.

Figure 3A:
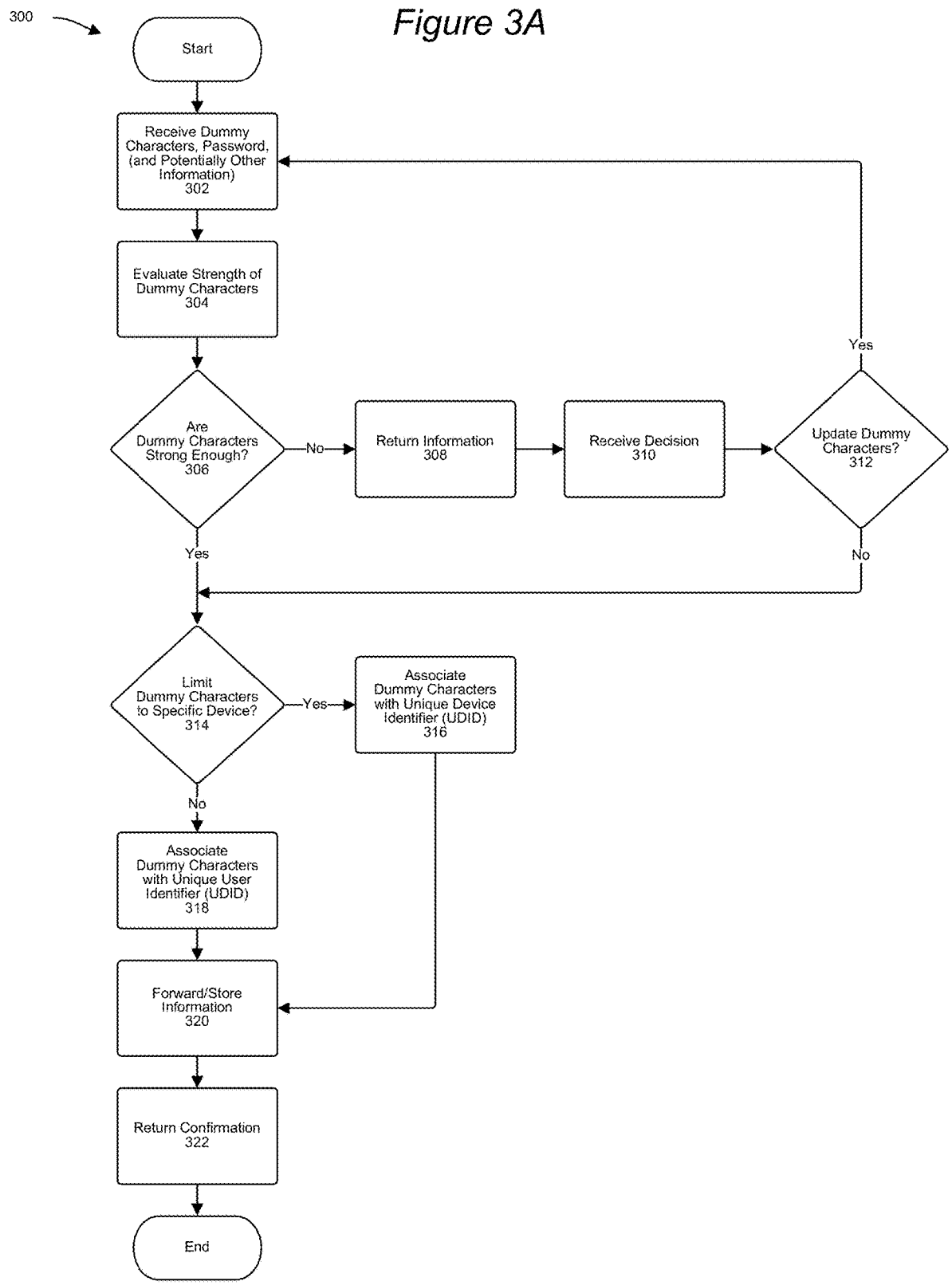
FIG. 3A is a flowchart for performing various steps of a process to evaluate and store a password with associated dummy characters, according to one embodiment of this disclosure.
Figure 3D:
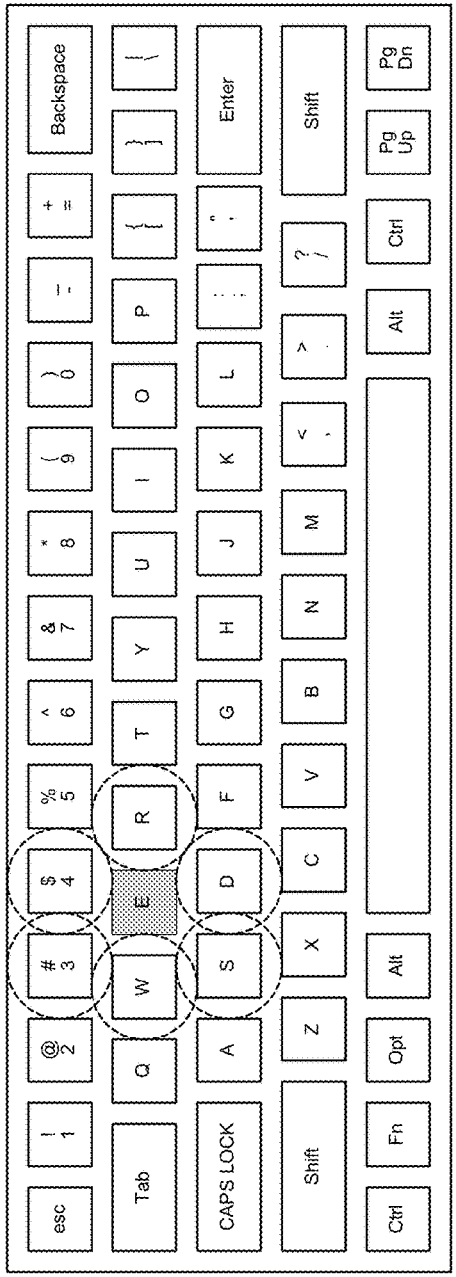
FIG. 3D is a block diagram depicting an example input device (e.g., a QWERTY-style English-language keyboard), with certain keys highlighted and circled for use in the discussion of FIG. 3A, according to one embodiment of this disclosure.
Figure 3E:
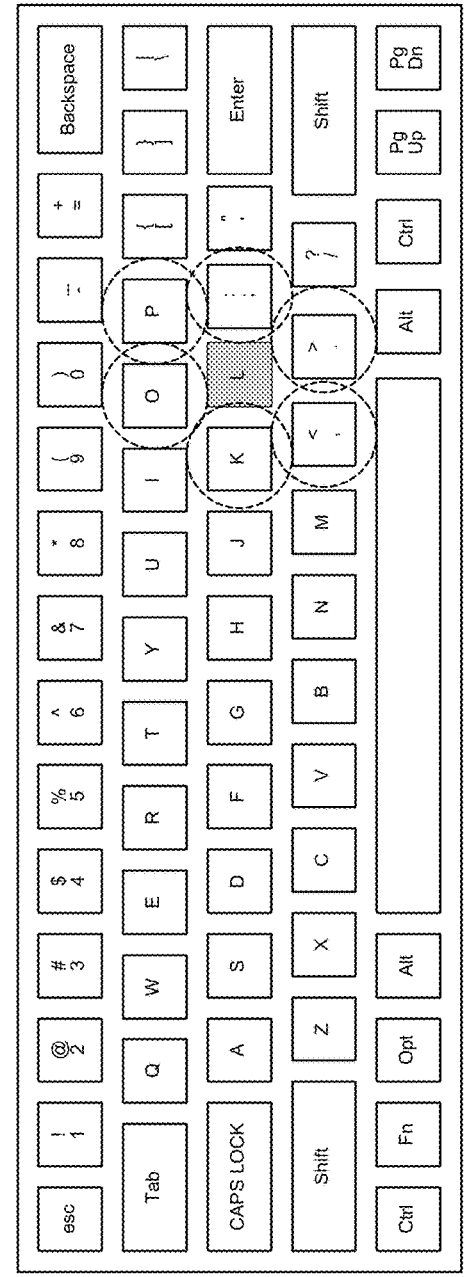
FIG. 3E is a block diagram depicting an example input device (e.g., a QWERTY-style English-language keyboard), with certain keys highlighted and circled for use in the discussion of FIG. 3A, according to one embodiment of this disclosure.

FIG. 3A is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIGS. 1A-C and 3A-F (in addition to FIG. 3A). In the flow diagram of FIG. 3A, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 300 is described with reference to FIGS. 1A-C and 3B-F as described above (as well as FIG. 3A), although other models, frameworks, systems and environments may be used to implement these processes.

To provide more detail, FIG. 3A is a flowchart of a process 300 that includes evaluating the strength of dummy characters and registering the dummy characters and information associated therewith, such as a username, password, and/or one or more identifying values (such as, e.g., a UUID and/or UDID) with which those dummy characters are associated, according to some embodiments. The process 300 may be performed by a computing device (such as, e.g., any client device 102 or server 114) or component thereof (such as any application backend 106) as described herein, and process 300 may also be performed in conjunction with one or more steps of one or more other processes described herein, such as method 200 and method 400.

In one embodiment, method 300 begins at 302, where method 300 receives information such as the dummy characters and password entered by a user (such as, e.g., in conjunction with method 200). Although not expressly depicted in FIG. 3A, the information received at 302 can also include other information, such as the user name associated with the dummy characters and password, as well as one or more identifying value (such as, e.g., a UUID and/or a UDID) that identifies a device (e.g., a client device, such as any client device 102) with which those dummy characters are specifically associated.

At 304, method 300 evaluates the strength of dummy characters 304. In certain embodiments, evaluating the strength of the dummy characters can include steps such as the following: (1) Collecting the characters used in the password (in certain embodiments, these characters may be collected and/or organized in a random sequence order, in order to provide for security while performing method 300). (2) With reference to whatever input device is being used to enter the characters (such as the example QWERTY keyboard shown in FIG. 1C), determining and storing the characters on the input device that surround the characters of the password. For instance, and in further reference to the example password used above ("$Dell321!"), the characters surrounding the $ would include the digit 4 (which is on the same key) and the letters E and R (in both capital and lowercase form), the characters surrounding the capital D would including a lowercase D and the characters E, R, S, F, X, X, and C (each in both capital and lowercase form), and so forth. (In one embodiment, only the characters that are immediately adjacent to a given key on the input device will be collected; so for example, if a capital F was part of the password, then lowercase f would be collected along with R, T, G, C, and V (in both their capital and lowercase forms) would be collected, but the character E, which is near the F key but not immediately adjacent to the F key, would not be collected. In embodiments, the specific characters that are collected, and the specific methodology used for collecting those keys, may differ. For instance, the opposite-case version of the characters used in the password are not collected in certain embodiments.) (3) Determining the intersection of the collections of surrounding keys may be used to determine a list of recommended dummy characters. (4) The recommended list of dummy characters developed in (3) may be further intersected or combined (in a logical "union") with a list of the most frequently used keys in the specific application for which the password is being entered, in order to further refine the list of recommended dummy characters. (The reader will appreciate that, while the term "list" can often be used to refer to a specific type of data structure within the field of computer science, the term "list" is being used in a more generic manner here.)

Figure 3F:
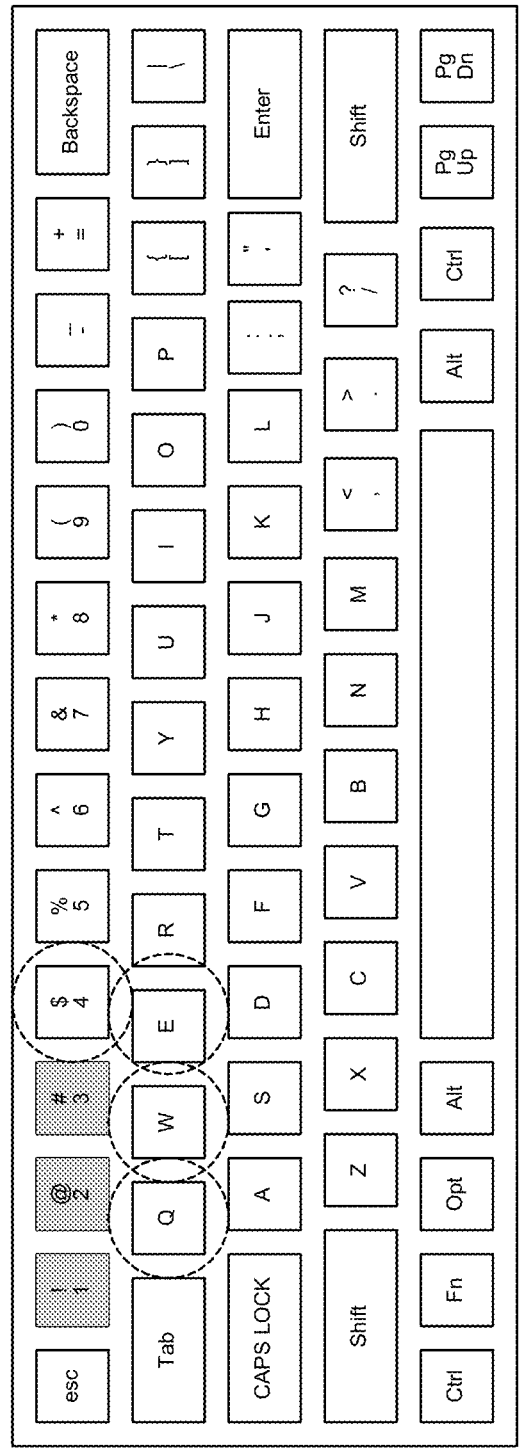
FIG. 3F is a block diagram depicting an example input device (e.g., a QWERTY-style English-language keyboard), with certain keys highlighted and circled for use in the discussion of FIG. 3A, according to one embodiment of this disclosure.

The foregoing discussion can be further understood with reference to FIGS. 3B-3E, each of which are block diagrams depicting a copy of the example QWERTY keyboard depicted in FIG. 1C, but with certain keys either highlighted or circled in each of FIGS. 3B-3E. As the reader will recall, the $ character is the first character of the example password used above ("$Dell321!"). As the reader will notice, in FIG. 3B, the key containing the $ is highlighted, and the surrounding keys are circled, all in according with step (2) above. As such, the characters that would be collected with respect to the $ character (of the example password) would be 3 and #, 4, 5 and %, e, E, r, and R, which can be represented for the sake of discussion as {3, #, 4, 5, %, e, E, r, R}. The reader will note that the characters in the foregoing list that are also part of the password will ultimately be excluded, thereby reducing the foregoing to {#, 4, 5, %, E, r, R}, which will be referred to herein as "character set 1". Turning next to FIG. 3C, the reader will notice that the second character of the example password is highlighted, that being capital D. The keys that surround D are circled, i.e., e/E, r/R, s/S, f/F, x/X, and c/C. After removing the characters that are also part of the password, the remaining characters in this group can be represented as {E, r, R, s, S, f, F, x, X, c, C}, and will be referred to herein as "character set 2." Similarly with respect to FIG. 3D, the third character of the example password is highlighted ("e"), with the surrounding keys circled. After removing the characters that are also part of the password, the remaining characters in this group can be represented as {#, 4, w, W, r, R, s, S, and d}. And likewise in FIG. 3E, the fourth letter of the example password is highlighted (lowercase "l"), and the surrounding keys are circled and can be represented as {o, O, p, P, k, K, : (colon), ; (semi-colon), < (greater than sign), (comma), > (less than sign), and . (period)}, and will be referring to herein as "character set 3." (The reader will appreciate that no characters had to be removed from character set 3, since none of these characters are also part of the example password being discussed herein.) Turning finally to FIG. 3F, the reader will notice that, for ease of discussion, the last four characters of the password (3, 2, 1, and !) are all highlighted in a single diagram, since they are all next to each other. The characters next to these keys are circled, and the alternate characters on the same keys would also be included when collecting the surrounding characters, but the characters used in the password itself would be excluded, as per the practice above. Combing the remaining characters into a single grouping, these characters can be represented as {@, #, 4, q, Q, w, W, E}, and will be referred to as "character set 4. As the reader will appreciate, in the embodiment described herein, the non-character keys (such as the escape key and the tab key) are also being excluded, although they could be included in various other embodiments.

After collecting the aforementioned character sets, the reader will notice that character sets 1, 2, and 4 all contain keys that overlap and which can be found on the "left side" of the keyboard, while character set 3 does not overlap with any of the other character sets at all. Thus, for purposes of step (3) above, the intersection of these three character sets would essentially be the intersection of character sets 1, 2, and 4, which again can respectively be represented as follows: {#, 4, 5, %, E, r, R}, {E, r, R, s, S, f, F, x, X, c, C}, and {@, #, 4, q, Q, w, W, E}. The intersection (or common characters) of all three of these character sets would be {E}, and the characters {#, 4, r, R} appear in two of the three character sets. Thus, in one embodiment, the character E and/or the character set {#, 4, E, r, R} (i.e., the union of {E} and {#, 4, r, R}) could be considered "first level recommendations" for the user's dummy characters. Although not expressly shown in any of the Figures herein, in one embodiment this information could be displayed to the user as suggested dummy characters in real-time in response to the user entering his or her (new) password, or once the password is otherwise known (such as via the login process). In other embodiments, this information can be retained for later use.

Once the list of "first level recommendations" has been determined, the logical "intersection" and the logical "union" of this list and the list of most frequently used characters in the associated application can both be determined, as part of (4) above. In one embodiment, the characters that appear in the intersection of these two lists can be considered "strong" dummy characters, the characters that appear in the union (combination) of these two lists can be considered "medium" dummy characters, and all remaining characters (including those not in either the list of "first level recommendations" or the list of most frequently used characters in the associated application) would be considered "weak" dummy characters.

Continuing with the example above, assume for the sake of discussion that the list of most frequently used characters in the associated application is {s, S, e, E, r, R, t, T, c, C, m, M, n, N}. Removing the characters that are part of the password, we are left with {s, S, E, r, R, t, T, c, C, m, M, n, N}. The intersection of this list and the list of "first level recommendations" would be {E, r, R}. In one embodiment, these three characters would therefore be considered "strong" dummy characters. The union of these two lists, but further excluding the characters that have already been determined to be "strong" dummy characters, would be {#, 4, s, S, t, T, c, C, m, M, n, N}. In one embodiment, these twelve characters would be considered "medium" dummy characters. All remaining possible characters would be considered "weak" dummy characters. (The reader will appreciate that in other embodiments, other specific parameters and methods of analysis are possible as well. For instance, in one embodiment, the intersection and union of "character set 3" and the list of most frequently used characters in the associated application can also be determined and used accordingly in conjunction with method 300 and the general functionality disclosed herein.)

Returning to our discussion of 304, the foregoing information can be used to determine which of the users chosen dummy characters are strong dummy characters, which are medium strength dummy characters, and which are weak dummy characters. This information can also (either alternatively or additionally) be further evaluated on a collective basis, such as, e.g., by requiring a set of dummy characters to include at least 1 "strong" dummy character and 3 "medium" strength dummy characters, among many other such examples, combinations, and evaluation possibilities. Method 300 determines in 306 whether the user's proposed dummy characters are strong enough. This evaluation can be based on various parameters and methods of analysis such as the example parameters and methods of analysis described herein, among other possibilities. If method 300 determines at 306 that the dummy characters are not sufficiently strong, method 300 proceeds to 308 and returns information (such as, e.g., to method 200) indicating information such as, e.g., the results of the evaluation of the strength of the dummy characters and/or a list of suggested strong and medium strength dummy characters. With reference to FIG. 2 and method 200, discussed above, this information could be received at 212 and evaluated at 214, with method 200 proceeding accordingly from there. If the information returned in 308 indicates that the dummy characters are insufficient for any reason, method 200 will generally determine at 214 that the dummy characters are not strong enough, and will proceed to perform one or more of 218, 220, and 222 (and further noting that, in practice, 224 in particular may be combined with 218 as a single step). As a result of these steps, method 200 receives user input in 220 indicating whether the user wishes to update the dummy characters, and method 200 then evaluates that information in 222.

If the user indicates in 220 that he or she does not want to update the dummy characters, method 200 can return the user's decision at 226. In one embodiment, that information can be received by method 300 at 310 and evaluated at 312. In the scenario that the user indicated that he or she does not want to update his or her dummy characters (even if they are weak or otherwise insufficient or less than ideal, etc.), 312 evaluates in the negative and method 300 proceeds to 314 without updating the dummy characters.

However, if the user indicates in 220 that he or she does want to update the dummy characters, method 200 can suggest stronger dummy characters in 224 and allow the user to update his/or her dummy characters at 204. (As noted above, in certain embodiments, 224 can be combined with 218, in which case an affirmative evaluation in 222 can result in method 200 returning directly to 204.) Method 200 can then perform 204, 206, and 208 (if necessary) again, and forward (such as, e.g., to method 300) the revised information (e.g., the user's revised password and/or dummy characters) at 210. (As an aside, the reader will appreciate that, in light of the discussion above regarding how the strength of dummy characters are evaluated, which is based in part on their proximity to characters in the actual password and the overlap of the characters surrounding each character in the actual password, changing the password itself can change the relative strength of the associated dummy characters even if the user does not change the dummy characters themselves.) In certain embodiments, the information forwarded at 210 can be received at 310 and lead to an affirmative evaluation at 312, in which case method 300 can proceed to 302 and continue on from there. In other embodiments, the decision (received in 310) and the information of 302 can be received in a single message or other communication, in which case the reader will appreciate that the revised dummy characters, password, and/or other potential information do not have to be "received" in 310 and then "received" again in the ensuing instance of 302. Either way, method 300 will perform a second instance of 302, and proceed from there.

If method 300 determines at 306 that the dummy characters are strong enough, method 300 determines at 314 whether to limit the dummy characters to (i.e., associate the dummy characters with) a specific device (or whether they should be associated with all devices that are associated with the user account that entered the dummy characters). For instance, in one embodiment, and in reference to FIG. 1A, client device 102(1) and client device 102(2) may both be associated with the same user—perhaps a smart phone and a desktop computer, in one example. For various reasons, the user may wish to associate a first set of dummy characters with one device, and a different set of dummy characters (or no dummy characters at all) with another device. In other embodiments, the system may require the dummy characters to be unique with respect to each device, irrespective of the user's wishes. In still other embodiments, the system may not necessarily require the dummy characters to be unique with respect to each device that is associated with the user, but the system may still require the identification of the specific device upon which the dummy characters were entered (even if the same set of dummy characters is used on multiple devices belonging to the same user). Functionality such as the foregoing can add increased security to a user's password, as this functionality can prevent a nosy bystander (or other person or machine who/which observes the exact sequence of keys pressed by a user when logging in to his/or her account) from simply entering that exact same sequence of keys (including the dummy characters) on a different device associated with that same user and gaining access to that user's account via nefarious behavior such as this. In any event, including for reasons other than those listed above, if method 300 determines at 314 that the dummy characters being evaluated here should be limited to (only associated with) the specific device upon which those dummy characters were entered, method 300 proceeds to 316 and associates a value that uniquely identifies that device (e.g., a unique device identifier, or "UDID") with the dummy characters. In one embodiment, a UDID (or other such value that uniquely identifies a user device) may be received in 302 along with the other information received in that step. In other embodiments, method 300 can determine this identifying value in other ways. In the specific embodiment shown in FIG. 3A, method 300 proceeds to 320 after performing 316, and as such, only one (but not both) of the UUID and the UDID (or other such identifying values) are associated with the dummy characters. In another embodiment, however, method 300 can proceed to 318 following 316 (and/or combine the steps), and thereby associate both a UUID and a UDID (or other such identifying values) with the dummy characters. The functionality of 318 is described in more detail below.

If method 300 determines at 314 that the dummy characters being evaluated here should not be limited to the specific device upon which those dummy characters were entered, but instead should be tied to the user account regardless of the specific device being used, method 300 proceeds to 318 and associates the dummy characters with the user himself or herself (such as, e.g., via association with a UUID or other such value). As such, any dummy characters associated with the user (and/or value uniquely identifying the user, such as, e.g., a UUID) himself or herself would therefore be applicable on any device associated with that user (and/or UUID).

At 320, the relevant information (along with other potential information) is forwarded to a memory for storage (or is otherwise stored). In an embodiment where the component performing method 300 (e.g., any application backend 106 as depicted in FIG. 1A) is located on the associated client device 102, method 300 can forward this information to a component such as server application 116 for storage in a memory such as application database 118, which storage can be performed, e.g., in conjunction with FIG. 4 and method 400. In an embodiment where the component performing method 300 (e.g., any application backend 106 as depicted in FIG. 1B) is located on a server (such as, e.g., server 114) or similar device, method 300 (or any component of system 100 that is configured to perform one or more steps of method 300) can perform one or more steps of method 400 itself in order to access a memory or other storage (such as, e.g., application database 118) in order to store the information.

At 322, method 300 returns a confirmation (such as, e.g., to method 200) indicating that the dummy character evaluation and/or storage was successful. In certain embodiments, more or less information can be included in the confirmation sent in 322. In certain embodiments, more than one separate confirmation can be sent in 322, such as one confirmation to indicating that the dummy characters were successfully evaluated (and/or sufficiently strong), and another confirmation to indicate that the necessary information was successfully stored. In certain embodiments, control returns to method 200 at 212 after one or more of the confirmation(s) is/are sent in 322. In other embodiments, control can return to 200 at one locations, or not at all.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 400 is described with reference to elements such as those described in connection with FIGS. 1A, 1B, and 1C. In the flow diagram of FIG. 4, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 400 is described with reference to FIGS. 1A, 1B, and 1C as described above, although other models, frameworks, systems and environments may be used to implement these processes.

To provide more detail, FIG. 4 is a flowchart of a process 400 that includes storing information in a memory such as, e.g., application database 118, according to some embodiments. In one embodiment, the information stored can include information such as such as a username, password, dummy characters, and/or one or more identifying values (such as, e.g., a UUID and/or a UDID). The process 400 may be performed by server 114, application backend 106 (especially as configured in FIG. 1B), server application 116, and/or application database 118 as described herein. Process 400 may also be performed in conjunction with one or more steps of one or more other processes described herein, such as method 200 and method 300.

At 402, method 400 receives information, such as, e.g., information related to a registration process as described herein. For instance, in one embodiment, method 400 receives information including one or more of the following: a username, a password, one or more dummy characters, and an identifying value (such as, e.g., a UUID and/a UDID). In other embodiments, method 400 may receive at 402 less than all of the information listed in the preceding sentence, and/or method 400 may also receive at 402 one or more pieces of information other than those listed in the preceding sentence. The dummy characters can be provided in various forms, such as one or more comma separated values (CSV), or in a data structure such as a list, dictionary, array, set, and so forth. In 404, method 400 stores the information received in 402. In various embodiments, method 400 may store all of the information received in 402, all of the information that is required for performance of the functionality described herein, or some other subset of the information received in 402. In various embodiments, the information is stored in a database such as, e.g., application database 118. In other embodiments, the information is stored in memory in a different form or format.

Figure 5:
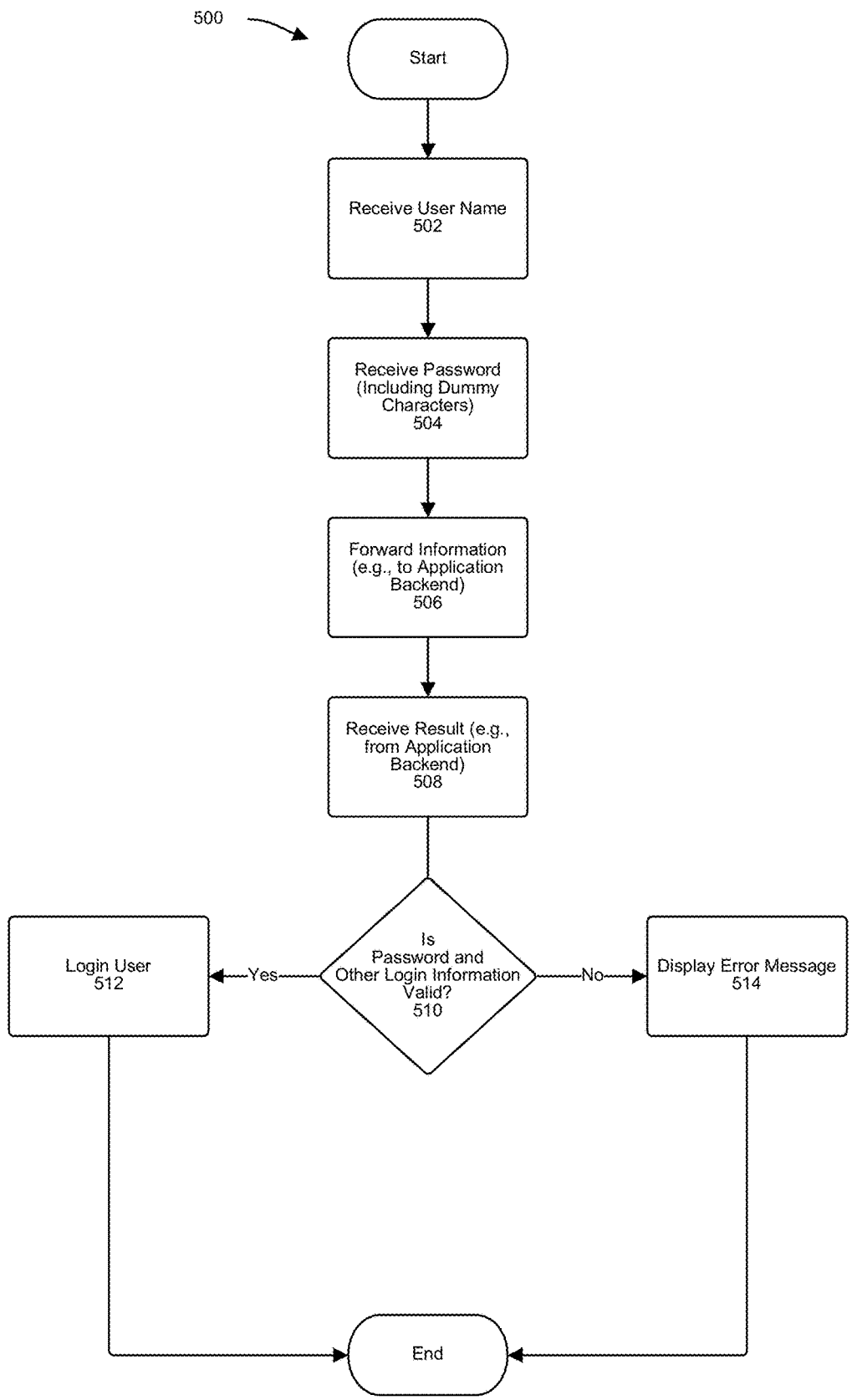
FIG. 5 is a flowchart for performing various steps of a process to login a user using a password with associated dummy characters, according to one embodiment of this disclosure.
Figure 6:
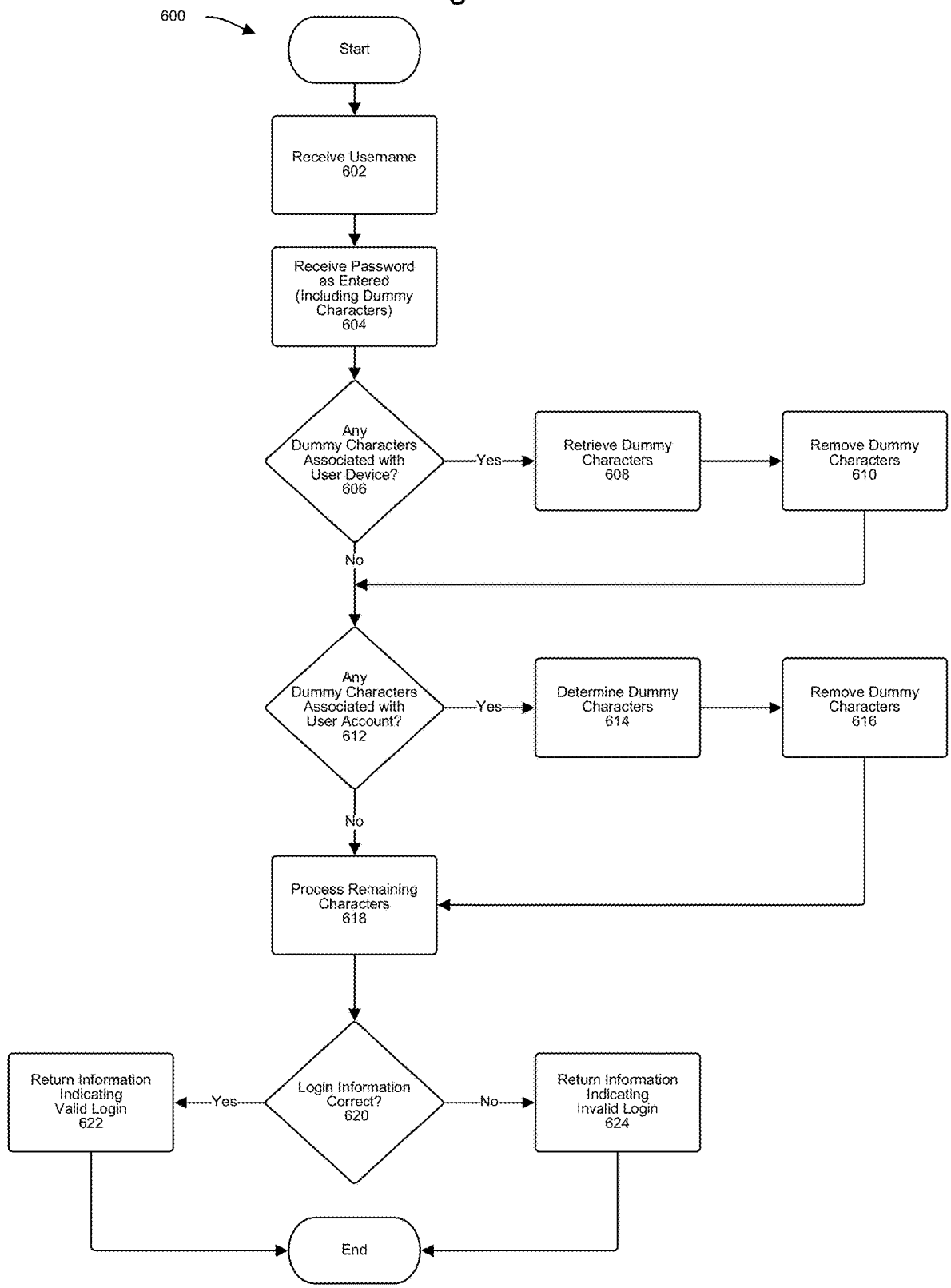
FIG. 6 is a flowchart for performing various steps of a process to login a user using a password with associated dummy characters, according to one embodiment of this disclosure.
Figure 7:
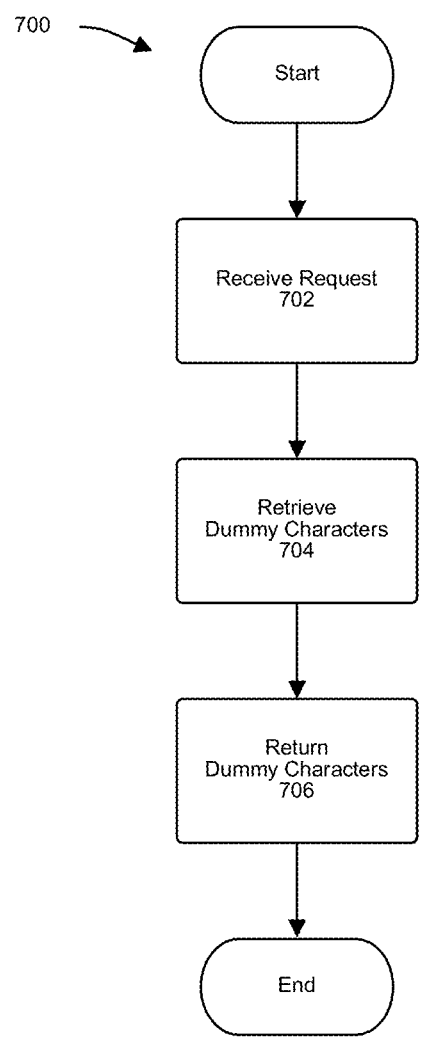
FIG. 7 is a flowchart for performing various steps of a process to retrieve information such as a user name, password, and dummy characters, according to one embodiment of this disclosure.

FIGS. 5, 6, and 7 collectively illustrate various actions generally pertaining to the process of using a previously entered and/or stored username, password, and/or dummy characters to perform various functionality related with a user login process. Turning first to FIG. 5, FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIGS. 1A-C and 3B-F. In the flow diagram of FIG. 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 500 is described with reference to FIGS. 1A-C and 3B-F as described above, although other models, frameworks, systems and environments may be used to implement these processes.

To provide more detail, FIG. 5 is a flowchart of a process 500 that includes receiving a username and a password that includes one or more dummy characters, and using that information to determine whether a user's login credentials are valid, according to some embodiments. The process 500 may be performed by a computing device (such as, e.g., any client device 102) as described herein, and process 500 may also be performed in conjunction with one or more steps of one or more other processes described herein, such as method 600 and method 700.

At 502, method 500 receives a user name. At 504, method 500 receives a password including dummy characters. This user name and password (including dummy characters) can be received by being entered in an input box of a web page "form," via a dedicated login window associated with an application, or via any other means. The user name and password (including dummy characters) will typically be entered by a user, although the user name and password (including dummy characters) may be entered (and thus, received) in other manners as well. The user name and password (including dummy characters) will typically be entered via an input device, such as an input device 108, such as, e.g., a QWERTY-style English language keyboard such as is shown in FIG. 1C. In other embodiments, other input devices can be used to enter this information. Moreover, in certain embodiments, steps 502 and 504 can be combined into a single step. Although not expressly shown in FIG. 5, method 500 can also receive other information, such as the value associated with a user account (e.g., UUID) and/or the value associated with a user device (e.g., UDID), as described elsewhere herein. One or more of these identifying values can be either automatically determined by method 500 or can be provided to method 500 in other manners, without necessarily requiring a user to actually enter this information as part of the login process (although, in some embodiments, the user can enter a value associated with the specific client device 102 that he or she is using, if he or she so chooses).

At 506, method 500 forwards information (such as, e.g., the information received in 502 and 504). In one embodiment, this information is forwarded to another component of system 100, such as any of the application backends 106 depicted in FIGS. 1A and 1B. In other embodiments, this information can be forwarded to other components, or can be processed by the same system component that received the information, such as, e.g., when a single component of the system is configured to perform methods 500 and 600. In one embodiment, the primary purpose (or at least, a primary purpose) of forwarding this information is so that the user name entered in 502 and the password (including dummy characters) entered in 504 can be evaluated to determine whether this information collectively provides valid login information. As will be discussed in more detail below, in conjunction with FIG. 6 and method 600, this information can be evaluated (such as, e.g., by another component of the system) to determine whether the information indicates a valid login, and the result of this evaluation can be returned to method 500 and received at 508. In one embodiment, the result received in 508 is received from an application backend 106. In other embodiments, the result received in 508 can be received from other components, including potentially from the same component being used to perform method 500, such as, e.g., when a single component of the system is configured to perform methods 500 and 600.

At 510, method 500 determines if the password received in 504 and other login credentials (such as the username received in 502) is/are valid. In one embodiment, this determination can be made based, at least in part, by analyzing the information received in 508, which in turn is based on one or more steps of method 600, which will be discussed in more detail below. If method 500 determines at 510 that the password received in 504 and other login credentials (such as the username received in 502) is/are valid, method 500 can login the user at 512. In various embodiments, this login process can include storing a cookie or other session identifier on a client machine, creating a session for the client on a server, and/or displaying a page (such as, e.g., a webpage), message, or other information indicating that the user's login attempt was successful, and/or providing the user with access to information that was not accessible to the user prior to the user being logged in. If method 500 determines at 510 that the password received in 504 and other login credentials (such as the username received in 502) is/are not valid, method 500 can display an error message (or other information) to the user at 514.

FIG. 6 is a flowchart of a method 600 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 600 is described with reference to elements such as those described in connection with FIGS. 1A-C and 3B-F. In the flow diagram of FIG. 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 600 is described with reference to FIGS. 1A-C and 3B-F as described above, although other models, frameworks, systems and environments may be used to implement these processes.

To provide more detail, FIG. 6 is a flowchart of a process 600 that includes evaluating a username and a password that includes one or more dummy characters in order to determine whether a user's login credentials are valid, according to some embodiments. The process 600 may be performed by a computing device (such as, e.g., any client device 102 or server 114) or component thereof (such as any application backend 106) as described herein, and process 500 may also be performed in conjunction with one or more steps of one or more other processes described herein, such as method 500 and method 700.

At 602, method 600 receives a user name. At 604, method 600 receives a password including dummy characters. In one embodiment, this user name and password (including dummy characters) can be received from method 500. In certain embodiments, steps 602 and 604 can be combined into a single step. Although not expressly shown in FIG. 6, method 600 can also receive other information (such as, e.g., from method 500), such as the value associated with a user (e.g., UUID) and/or a user device (e.g., UDID), as described elsewhere herein.

At 606, method 600 determines whether dummy characters are associated with the specific user device from which the login information was received in 602 and 604 (or whether dummy characters are only associated with a user account more generally, but not a specific user device). This determination can be made by reading information that was previously stored, such as information discussed in conjunction with FIG. 3A and FIG. 4. In other embodiments, this determination can be made in other manners. If method 600 determines that dummy characters are associated with the specific user device (such as, e.g., based on a UDID value) from which the login information was received, method 600 retrieves those dummy characters from the location in which they are stored at 608. In one embodiment, method 600 retrieves these dummy characters from application database 118, either directly (in an embodiment where the component performing method 600 is directly connected to application database 118) or indirectly (in an embodiment such as is shown in FIG. 1A, in which an application backend 106 may have to communicate with a server application 116 to ultimately access the application database 118 and retrieve the requested information).

After retrieving (or otherwise determining) any dummy characters that are associated with the specific user device from which the login information was received (if any), method 600 removes those dummy characters from the password string (including the dummy characters) that was received in 604. For instance, continuing with the example provided above, if the user's password is $Dell321! and the user had chosen {E, r, R, s, d} as dummy characters associated with his or her specific user device, then method 600 would retrieve those dummy characters in 608 and remove them from the received password (including the dummy characters) in 610. For instance, if the password received in 604 was the following string of characters (without the quotes): $dDeELILl3E2rl!, then method 600 would remove the characters {E, r, R, s, d} at this point, leaving the method with $DeLILl321! as a temporary (or intermediate) result.

At 612, method 600 would determine if any (other) dummy characters are associated with a specific user account (such as, e.g., based on a UUID value). (The reader will appreciate that any dummy characters that are associated with both a UDID and a UUID do not necessarily have to be identified twice, and do not necessarily have to be removed twice from the password string that had been entered as part of the login process.) The determination of 614 can be made by reading information that was previously stored, such as information discussed in conjunction with FIG. 3A and FIG. 4. In other embodiments, this determination can be made in other manners. In still other embodiments, 612 can be configured to automatically evaluate to true. If method 600 determines that dummy characters are associated with the specific user who is attempting to login here, method 600 retrieves those dummy characters from the location in which they are stored at 614. (In certain embodiments, 614 can be performing without requiring 612 to be performed.) In one embodiment, method 600 retrieves these dummy characters from application database 118, either directly (in an embodiment where the component performing method 600 is directly connected to application database 118) or indirectly (in an embodiment such as is shown in FIG. 1A, in which an application backend 106 may have to communicate with a server application 116 to ultimately access the application database 118 and retrieve the requested information).

After retrieving (or otherwise determining) any dummy characters that are associated with the specific user from which the login information was received, method 600 removes those dummy characters from either the password string (including the dummy characters) that was received in 604, or from the temporary (intermediate) result calculated in 610, as appropriate. For instance, continuing with the example provided above, where the user's password is $Dell321! recall that method 600 had calculated a temporary (or intermediate) result of $DeLILl321! after removing the dummy characters associated with specific user device in 610. Now further assume that the user had chosen {J, K, L} as dummy characters associated with his or her user account, then method 600 would retrieve those dummy characters in 614 and remove them from the received password (including the dummy characters) in 616. After removing all of the dummy characters, the received password would now have a value of $Dell321! as the "remaining characters" of the password that was received in 604. These remaining characters can then be evaluated in 618 to determine whether they represent the valid password associated with the username received in 602. In this case, the remaining characters do represent the valid password associated with the username received in 602. As such, method 600 would determine in 620 that the login information is correct, and method 600 would return (such as, e.g., to method 500) information indicating that the login was valid in 622. If, in a different instance, method 600 determine in 620 that the login information is not correct, and method 600 would return (such as, e.g., to method 500) information indicating that the login was invalid in 624.

FIG. 7 is a flowchart of a method 700 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 700 is described with reference to elements such as those described in connection with FIGS. 1A, 1B, and 1C. In the flow diagram of FIG. 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 700 is described with reference to FIGS. 1A, 1B, and 1C as described above, although other models, frameworks, systems and environments may be used to implement these processes.

To provide more detail, FIG. 7 is a flowchart of a process 700 that includes retrieving information from a memory such as, e.g., application database 118, according to some embodiments. The process 700 may be performed by server 114 and/or application database 118 as described herein. At 702, method 700 receives a request for information, such as, e.g., the dummy character(s) associated with a given username and/or password and/or device (e.g., a client device, such as any of client devices 102). For instance, in one embodiment, method 700 receives a request for the dummy character(s) associated with a username, password, and one or more identifying values (such as, e.g., a UUID and/or a UDID) that had been previously stored, such as, e.g., in an iteration of method 400. In a different embodiment of 702, method 700 receives a request for information, such as, e.g., the dummy character(s) and the password associated with a given username and/or device (e.g., a client device, such as any of client devices 102). For instance, in one embodiment, method 700 receives a request for the dummy character(s) and the password associated with a username and one or more identifying values (such as, e.g., a UUID and/or a UDID) that had been previously stored, such as, e.g., in an iteration of method 400. At 704, method 700 retrieves the information that was requested in 702. For instance, method 700 can retrieve this information by using a SELECT statement if the information is stored in a SQL database, or by any other functionality appropriate to retrieve the information from the location and/or data structure in which the information is stored. At 706, method 700 returns the requested information to the component or module that requested the information, such as, e.g., an application backend 106. The dummy characters can be returned in various forms, such as one or more comma separated values (CSV), or in a data structure such as a list, dictionary, array, set, and so forth. In an embodiment where the information requested in 702 was requested by a device (or component, module, etc.) performing one or more steps of method 600 (such as, e.g., step 608), the information returned in 706 can be used to perform one or more steps of method 600.

Figure 8:
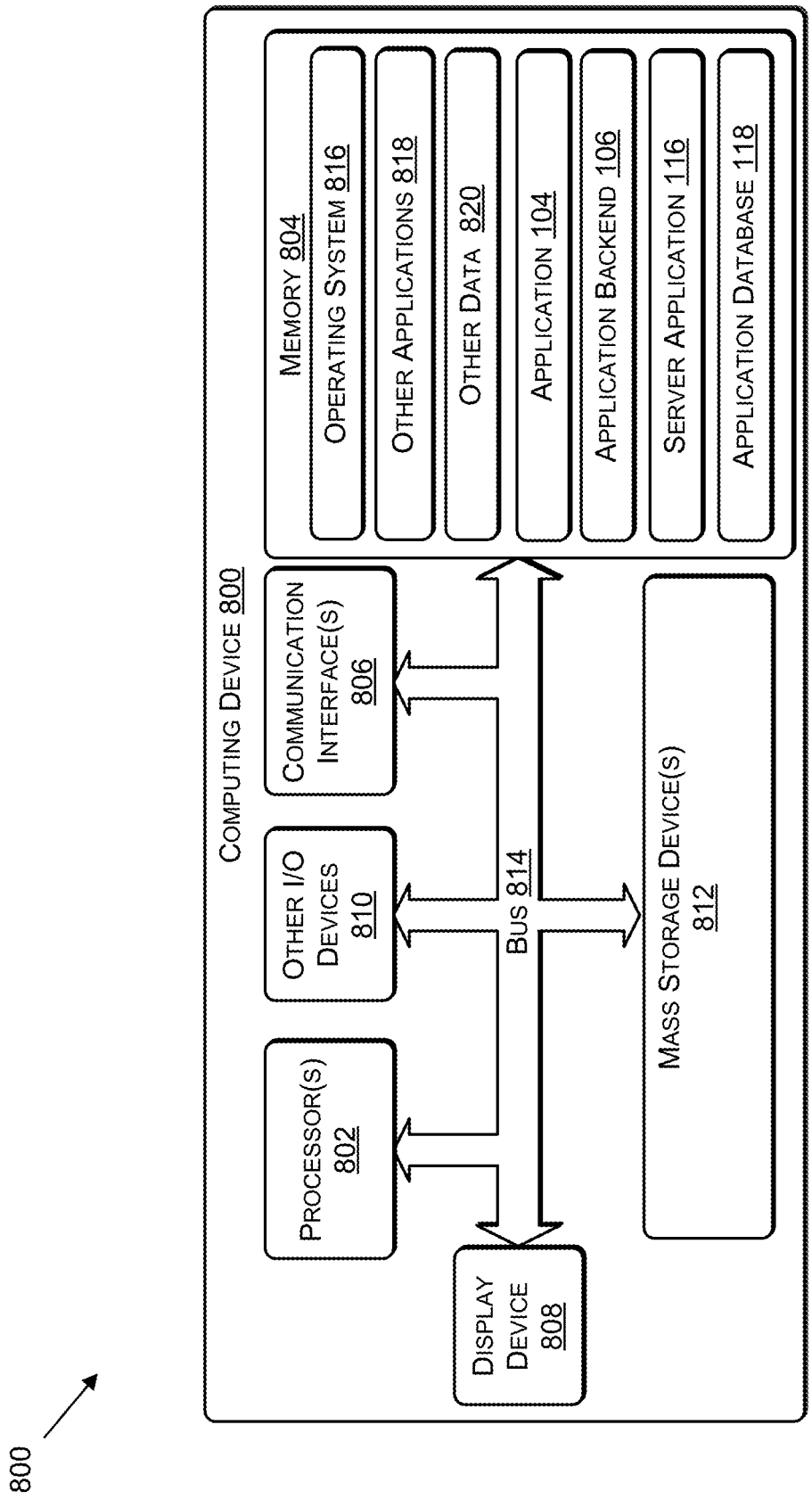
FIG. 8 illustrates an example configuration of a computing device that can be used to implement the systems and techniques described herein.

FIG. 8 illustrates an example configuration of a computing device 800 that can be used to implement the systems and techniques described herein, such as, for example, client devices 102, server 114, or another component illustrated in FIGS. 1A, 1B, and/or 1C. The computing device 800 may include one or more processors 802, a memory 804, communication interfaces 806, a display device 808, other input/output (I/O) devices 810, and one or more mass storage devices 812, configured to communicate with each other, such as via one or more system buses 814 or other suitable connection. While a single bus 814 is illustrated for ease of understanding, it should understood that the system bus 814 may include multiple buses, such as memory device buses, storage device buses, power buses, video signal buses, and the like.

The processor(s) 802 are one or more hardware devices that may include a single processing unit or a number of processing units, all of which may include single or multiple computing units or multiple cores. The processor(s) 802 may be implemented as one or more microprocessors, microcomputers, microcontrollers, digital signal processors, central processing units, graphics processing units, state machines, logic circuitries, and/or any hardware devices that manipulate signals based on operational instructions. Among other capabilities, the processor(s) 802 may be configured to fetch and execute computer-readable instructions stored in the memory 804, mass storage devices 812, or other computer-readable media.

Memory 804 and mass storage devices 812 are examples of computer storage media (e.g., memory storage devices) for storing instructions that can be executed by the processor 802 to perform the various functions described herein. For example, memory 804 may include both volatile memory and non-volatile memory (e.g., random access memory (RAM), read-only memory (ROM), or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be a media capable of storing computer-readable, processor-executable program instructions as computer program code that can be executed by the processor 802 as a particular machine configured for carrying out the operations and functions described in the implementations herein.

The computing device 800 may also include one or more communication interfaces 806 for exchanging data via the network 110 with network connections 112. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 806 can also provide communication with external storage (not shown), such as in a storage array, network attached storage, storage area network, or the like. A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, and so forth.

The computer storage media, such as memory 804 and mass storage devices 812, may be used to store software and data. For example, the computer storage media may be used to store one or more applications 104, one or more an application backends 106, one or more server applications 116, one or more application databases 118, an operating system 816, other applications 818, and other data 820.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one embodiment," "this embodiment," "these embodiment," or "some embodiment," means that a particular feature, structure, or characteristic described is included in at least one embodiment, and the appearances of these phrases in various places in the specification are not necessarily all referring to the same embodiment.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving a password and dummy characters associated with the password;
evaluating the dummy characters, wherein
evaluating the dummy characters comprises
for each of the dummy characters, identifying a list of characters on an input device that surround the respective dummy character on the input device, in order to create a plurality of lists of surrounding characters;
determining a logical intersection of the plurality of lists with each other, in order to identify a list of preferred dummy characters;
identifying a list of most commonly used characters with respect to an application associated with the password;
identifying one or more strong dummy characters for the password, wherein
the one or more strong dummy characters are identified by determining a logical intersection of the list of preferred dummy characters and the list of most commonly used characters;
identifying one or more medium-strength dummy characters for the password, wherein
the one or more medium-strength dummy characters are identified by determining a logical union of the list of preferred dummy characters and the list of most commonly used characters; and
identifying one or more weak dummy characters for the password, wherein
the one or more weak dummy characters are identified by identifying one or more characters that are not among the strong dummy characters or the medium-strength dummy characters;
storing the password and the dummy characters in a non-volatile memory;
receiving a login request, wherein
the login request comprises a password string;
processing the login request, wherein
processing the login request comprises
retrieving the password and the dummy characters from the non-volatile memory,
removing the dummy characters from the password string to create a modified password string, and
comparing the modified password string to the password to determine whether to approve the login request.

2. The method of claim 1, wherein
evaluating the dummy characters further comprises determining whether any of the dummy characters are used in the password; and
in response to a determination that at least one of the dummy characters are used in the password, notifying a user that the dummy characters and the password are an invalid combination.

3. The method of claim 1, wherein
evaluating the dummy characters further comprises determining whether each of the dummy characters is one of the one or more strong dummy characters, one of the one or more medium-strength dummy characters, or one of the one or more weak dummy characters.

4. The method of claim 1, wherein
the one or more dummy characters are associated with a user of the input device, wherein the user is identified, at least in part, by a unique user identifier ("UUID") value;
the storing further comprises storing the UUID associated with the one or more dummy characters; and
the retrieving the password and the dummy characters from the non-volatile memory is based, at least in part, on the UUID value.

5. The method of claim 1, wherein
evaluating the dummy characters further comprises
determining whether each of the dummy characters is one of the one or more weak dummy characters; and
in response to determining that any of the dummy characters is one of the one or more
weak dummy characters, suggesting one or more replacement dummy characters, wherein
each replacement dummy character is a strong dummy character or a medium-strength dummy character.

6. The method of claim 1 wherein
evaluating the dummy characters further comprises
determining whether each of the dummy characters is one of the one or more strong dummy characters, one of the one or more medium-strength dummy characters, or one of the one or more weak dummy characters; and
in response to determining that any of the dummy characters is one of the one or more
weak dummy characters, providing a notification to a user, wherein
the notification requests the user to change the weak dummy character.

7. The method of claim 1, wherein
the one or more dummy characters are associated with a specific device, wherein
the specific device is identified, at least in part, by a first unique device identification ("UDID") value;
the storing further comprises storing the first UDID associated with the one or more dummy characters;
the login request further comprises information identifying a user device upon which the login request was entered, wherein
the user device is identified, at least in part, by a second unique device identification ("UDID") value; and
the retrieving the password and the dummy characters from the non-volatile memory is based, at least in part, on the second UUID value.

8. A computing device comprising:
a touchscreen display device;
one or more processors; and
one or more non-transitory computer-readable storage media to store instructions executable by the one or more processors to perform operations comprising:
receiving a password and dummy characters associated with the password;
evaluating the dummy characters, wherein
evaluating the dummy characters comprises
for each of the dummy characters, identifying a list of characters on an input device that surround the respective dummy character on the input device, in order to create a plurality of lists of surrounding characters;
determining a logical intersection of the plurality of lists with each other, in order to identify a list of preferred dummy characters;

identifying a list of most commonly used characters with respect to an application associated with the password;
identifying one or more strong dummy characters for the password, wherein
the one or more strong dummy characters are identified by determining a logical intersection of the list of preferred dummy characters and the list of most commonly used characters;
identifying one or more medium-strength dummy characters for the password, wherein
the one or more medium-strength dummy characters are identified by determining a logical union of the list of preferred dummy characters and the list of most commonly used characters; and
identifying one or more weak dummy characters for the password, wherein
the one or more weak dummy characters are identified by identifying one or more characters that are not among the strong dummy characters or the medium-strength dummy characters;
storing the password and the dummy characters in a non-volatile memory;
receiving a login request, wherein
the login request comprises a password string;
processing the login request, wherein
processing the login request comprises
retrieving the password and the dummy characters from the non-volatile memory,
removing the dummy characters from the password string to create a modified password string, and
comparing the modified password string to the password to determine whether to approve the login request.

9. The computing device of claim 8, wherein
evaluating the dummy characters further comprises determining whether any of the dummy characters are used in the password; and
in response to a determination that at least one of the dummy characters are used in the password, notifying a user that the dummy characters and the password are an invalid combination.

10. The computing device of claim 8, wherein
evaluating the dummy characters further comprises determining whether each of the dummy characters is one of the one or more strong dummy characters, one of the one or more medium-strength dummy characters, or one of the one or more weak dummy characters.

11. The computing device of claim 8, wherein
identifying the list of characters that surround the respective dummy character further comprises
selecting only characters that are immediately adjacent to a key corresponding to the respective dummy character on the input device.

12. The computing device of claim 8, wherein
evaluating the dummy characters further comprises
determining whether each of the dummy characters is one of the one or more weak dummy characters; and
in response to determining that any of the dummy characters is one of the one or more
weak dummy characters, suggesting one or more replacement dummy characters, wherein
each replacement dummy character is a strong dummy character or a medium-strength dummy character.

13. The computing device of claim 8, wherein
evaluating the dummy characters further comprises
determining whether each of the dummy characters is one of the one or more strong dummy characters, one of the one or more medium-strength dummy characters, or one of the one or more weak dummy characters; and
in response to determining that any of the dummy characters is one of the one or more weak dummy characters, providing a notification to a user, wherein
the notification requests the user to change the weak dummy character.

14. The computing device of claim 8, wherein
the one or more dummy characters are associated with a specific device, wherein
the specific device is identified, at least in part, by a first unique device identification ("UDID") value;
the storing further comprises storing the first UDID associated with the one or more dummy characters;
the login request further comprises information identifying a user device upon which the login request was entered, wherein
the user device is identified, at least in part, by a second unique device identification ("UDID") value; and
the retrieving the password and the dummy characters from the non-volatile memory is based, at least in part, on the second UUID value.

15. One or more non-transitory computer-readable storage media to store instructions executable by one or more processors to perform operations comprising:
receiving a password and dummy characters associated with the password;
evaluating the dummy characters, wherein
evaluating the dummy characters comprises
for each of the dummy characters, identifying a list of characters on an input device that surround the respective dummy character on the input device, in order to create a plurality of lists of surrounding characters;
determining a logical intersection of the plurality of lists with each other, in order to identify a list of preferred dummy characters;
identifying a list of most commonly used characters with respect to an application associated with the password;
identifying one or more strong dummy characters for the password, wherein
the one or more strong dummy characters are identified by determining a logical intersection of the list of preferred dummy characters and the list of most commonly used characters;
identifying one or more medium-strength dummy characters for the password, wherein
the one or more medium-strength dummy characters are identified by determining a logical union of the list of preferred dummy characters and the list of most commonly used characters; and
identifying one or more weak dummy characters for the password, wherein
the one or more weak dummy characters are identified by identifying one or more characters that are not among the strong dummy characters or the medium-strength dummy characters;

storing the password and the dummy characters in a non-volatile memory;

receiving a login request, wherein
the login request comprises a password string;

processing the login request, wherein
processing the login request comprises
retrieving the password and the dummy characters from the non-volatile memory,
removing the dummy characters from the password string to create a modified password string, and
comparing the modified password string to the password to determine whether to approve the login request.

16. The one or more non-transitory computer-readable storage media of claim 15, wherein
evaluating the dummy characters further comprises determining whether any of the dummy characters are used in the password; and
in response to a determination that at least one of the dummy characters are used in the password, notifying a user that the dummy characters and the password are an invalid combination.

17. The one or more non-transitory computer-readable storage media of claim 15, wherein
evaluating the dummy characters further comprises determining whether each of the dummy characters is one of the one or more strong dummy characters, one of the one or more medium-strength dummy characters, or one of the one or more weak dummy characters.

18. The one or more non-transitory computer-readable storage media of claim 15, wherein
identifying the list of characters that surround the respective dummy character further comprises
selecting only characters that are immediately adjacent to a key corresponding to the respective dummy character on the input device.

19. The one or more non-transitory computer-readable storage media of claim 15, wherein
the one or more dummy characters are associated with a user of the input device, wherein the user is identified, at least in part, by a unique user identifier ("UUID") value;
the storing further comprises storing the UUID associated with the one or more dummy characters; and
the retrieving the password and the dummy characters from the non-volatile memory is based, at least in part, on the UUID value.

20. The one or more non-transitory computer-readable storage media of claim 15, wherein
evaluating the dummy characters further comprises
determining whether each of the dummy characters is one of the one or more strong dummy characters, one of the one or more medium-strength dummy characters, or one of the one or more weak dummy characters; and
in response to determining that any of the dummy characters is one of the one or more weak dummy characters, providing a notification to a user, wherein
the notification requests the user to change the weak dummy character.

* * * * *